(12) United States Patent
Koeppel et al.

(10) Patent No.: US 10,762,489 B2
(45) Date of Patent: Sep. 1, 2020

(54) SELECTING A TRANSACTION CARD FOR A TRANSACTION BASED ON CHARACTERISTICS OF THE TRANSACTION

(71) Applicant: Capital One Services, LLC, McLean, VA (US)

(72) Inventors: Adam Koeppel, Washington, DC (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/365,341

(22) Filed: Mar. 26, 2019

(65) Prior Publication Data

US 2019/0220840 A1     Jul. 18, 2019

Related U.S. Application Data

(63) Continuation of application No. 15/725,022, filed on Oct. 4, 2017, now Pat. No. 10,275,755.

(51) Int. Cl.
*G06Q 30/00*     (2012.01)
*G06Q 20/22*     (2012.01)
(Continued)

(52) U.S. Cl.
CPC ......... *G06Q 20/227* (2013.01); *G06Q 20/327* (2013.01); *G06Q 20/341* (2013.01);
(Continued)

(58) Field of Classification Search
CPC .. G06Q 20/227; G06Q 20/352; G06Q 20/341; G06Q 20/327; G06Q 20/36;
(Continued)

(56) References Cited

U.S. PATENT DOCUMENTS

| 5,748,737 A | 5/1998 | Daggar et al. |
| 5,945,652 A | 8/1999 | Ohki et al. |

(Continued)

FOREIGN PATENT DOCUMENTS

| EP | 2028627 A1 | 2/2009 |
| EP | 2028628 A2 | 2/2009 |

(Continued)

OTHER PUBLICATIONS

"Emerging ecommerce credit and debit card protocols". (Year: 2002).*

(Continued)

*Primary Examiner* — Maria V Vanderhorst
(74) *Attorney, Agent, or Firm* — Harrity & Harrity, LLP

(57) ABSTRACT

An example electronic wallet device may include a plurality of card slots configured to hold transaction cards, each card slot, of the plurality of card slots, including a card reader, and the plurality of card slots holding at least two transaction cards; and one or more processors to receive transaction information associated with a transaction at a transaction terminal, select a transaction card, of the at least two transaction cards based on the received transaction information, and/or provide a transaction token, associated with the selected transaction card to be used in connection with the transaction terminal to process the transaction.

20 Claims, 18 Drawing Sheets

(51) Int. Cl.
   *G06Q 20/34*    (2012.01)
   *G06Q 30/02*    (2012.01)
   *G06Q 20/36*    (2012.01)
   *G06Q 20/32*    (2012.01)
   *G07F 7/08*     (2006.01)
   *G05B 19/418*   (2006.01)

(52) U.S. Cl.
   CPC ....... *G06Q 20/352* (2013.01); *G06Q 20/3572* (2013.01); *G06Q 20/36* (2013.01); *G06Q 30/0222* (2013.01); *G07F 7/0886* (2013.01); *G07F 7/0893* (2013.01)

(58) Field of Classification Search
   CPC ........... G06Q 30/0222; G06Q 20/3572; G06Q 30/0226; G06Q 20/367; G06Q 20/3567; G06Q 20/3555; G07F 7/0893; G07F 7/0886
   See application file for complete search history.

(56) References Cited

U.S. PATENT DOCUMENTS

| | | | |
|---|---|---|---|
| 6,353,811 | B1 | 3/2002 | Weissman et al. |
| D651,237 | S | 12/2011 | Mullen et al. |
| D651,238 | S | 12/2011 | Mullen et al. |
| D651,644 | S | 1/2012 | Mullen et al. |
| D652,075 | S | 1/2012 | Mullen et al. |
| D652,076 | S | 1/2012 | Mullen et al. |
| D652,448 | S | 1/2012 | Mullen et al. |
| D652,449 | S | 1/2012 | Mullen et al. |
| D652,450 | S | 1/2012 | Mullen et al. |
| D652,867 | S | 1/2012 | Mullen et al. |
| D653,288 | S | 1/2012 | Mullen et al. |
| D665,022 | S | 8/2012 | Mullen et al. |
| D665,447 | S | 8/2012 | Mullen et al. |
| D666,241 | S | 8/2012 | Mullen et al. |
| D670,329 | S | 11/2012 | Mullen et al. |
| D670,330 | S | 11/2012 | Mullen et al. |
| D670,331 | S | 11/2012 | Mullen et al. |
| D670,332 | S | 11/2012 | Mullen et al. |
| D670,759 | S | 11/2012 | Mullen et al. |
| D672,389 | S | 12/2012 | Mullen et al. |
| D673,606 | S | 1/2013 | Mullen et al. |
| D674,013 | S | 1/2013 | Mullen et al. |
| D675,256 | S | 1/2013 | Mullen et al. |
| D676,487 | S | 2/2013 | Mullen et al. |
| D676,904 | S | 2/2013 | Mullen et al. |
| D687,094 | S | 7/2013 | Mullen et al. |
| D687,095 | S | 7/2013 | Mullen et al. |
| D687,487 | S | 8/2013 | Mullen et al. |
| D687,488 | S | 8/2013 | Mullen et al. |
| D687,489 | S | 8/2013 | Mullen et al. |
| D687,490 | S | 8/2013 | Mullen et al. |
| D687,887 | S | 8/2013 | Mullen et al. |
| D688,744 | S | 8/2013 | Mullen et al. |
| D692,053 | S | 10/2013 | Mullen et al. |
| 10,089,619 | B1 | 10/2018 | Koeppel et al. |
| 2008/0059379 | A1 | 3/2008 | Ramaci et al. |
| 2009/0050686 | A1* | 2/2009 | Kon ..................... G06Q 20/327 235/375 |
| 2009/0050688 | A1* | 2/2009 | Kon ..................... G06Q 20/042 235/375 |
| 2009/0050689 | A1* | 2/2009 | Sako .................. G06Q 20/0658 235/375 |
| 2010/0217707 | A1 | 8/2010 | Phillips et al. |
| 2013/0080322 | A1 | 3/2013 | Adolphe et al. |
| 2013/0304576 | A1* | 11/2013 | Berland ................. G06Q 50/01 705/14.53 |
| 2014/0006277 | A1 | 1/2014 | Rao et al. |
| 2014/0129357 | A1 | 5/2014 | Goodwin et al. |
| 2014/0291392 | A1 | 10/2014 | Teuwen et al. |
| 2014/0344153 | A1 | 11/2014 | Raj et al. |
| 2015/0227957 | A1 | 8/2015 | Bradley et al. |
| 2017/0046688 | A1 | 2/2017 | Pande et al. |
| 2018/0165759 | A1* | 6/2018 | Carrington ............. G06Q 40/02 |
| 2018/0315038 | A1* | 11/2018 | Rezayee ............... H04W 76/10 |

FOREIGN PATENT DOCUMENTS

| | | |
|---|---|---|
| EP | 2028630 A2 | 2/2009 |
| EP | 2034425 A1 | 3/2009 |
| GB | 2346245 A | 8/2000 |
| WO | 2016123410 A1 | 8/2016 |

OTHER PUBLICATIONS

Extended European Search Report for Application No. EP18198078.0, dated Dec. 7, 2018, 8 pages.

Lacmanović I., et al., "Contactless Payment Systems Based on RFID Technology," The 33rd International Convention MIPRO, 2010, pp. 1114-1119.

Me G., et al., "Mobile Local Macropayments: Security and Prototyping," IEEE Pervasive Computing, 2006, vol. 5 (4), pp. 94-100.

Singh S., "Emergence of Payment Systems in the Age of Electronic Commerce: The State of Art," Department of Commerce, Ramjas College, University of Delhi, 2009, 18 pages.

Co-pending U.S. Appl. No. 15/725,022, filed Oct. 4, 2017.

* cited by examiner

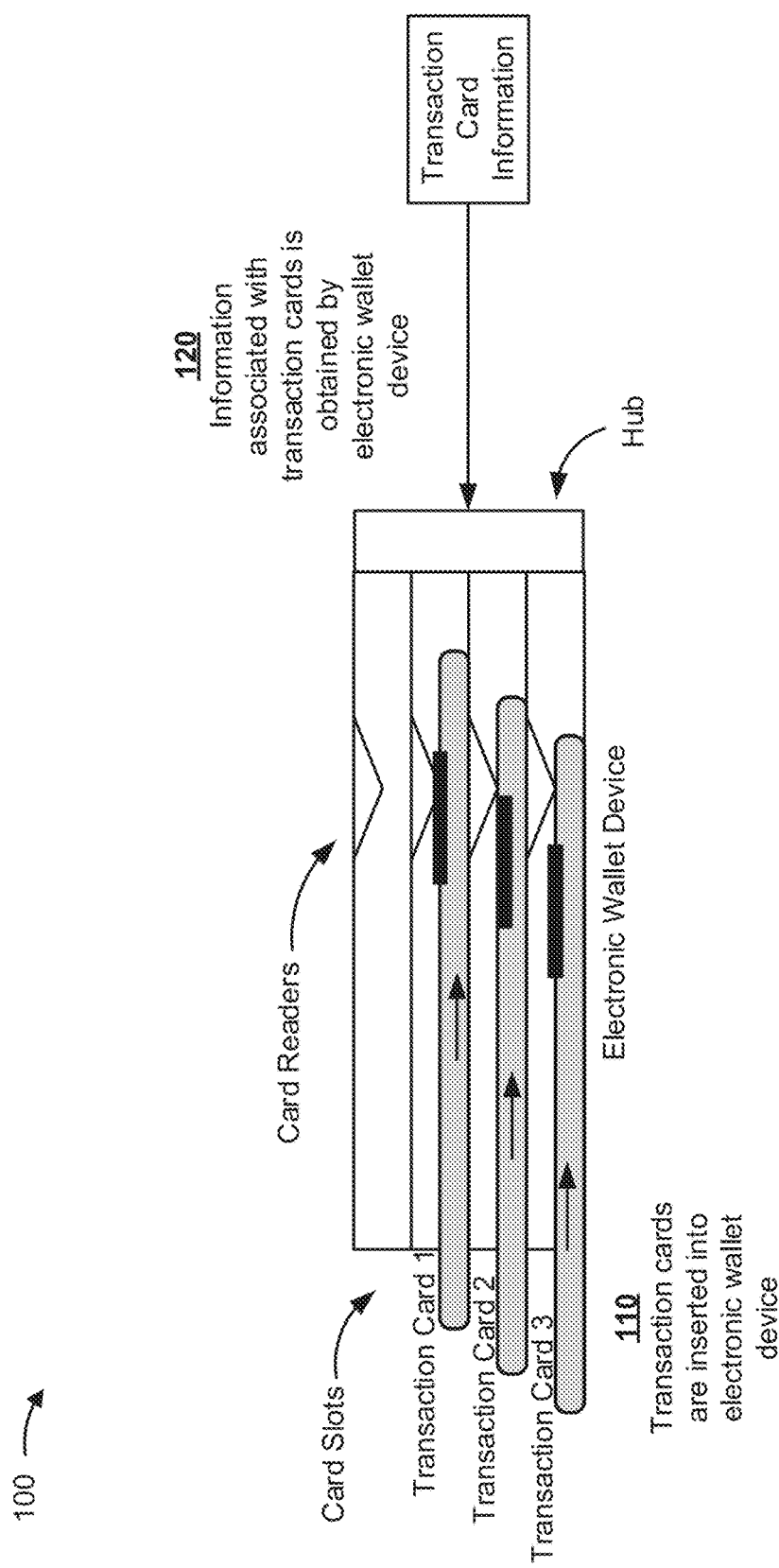

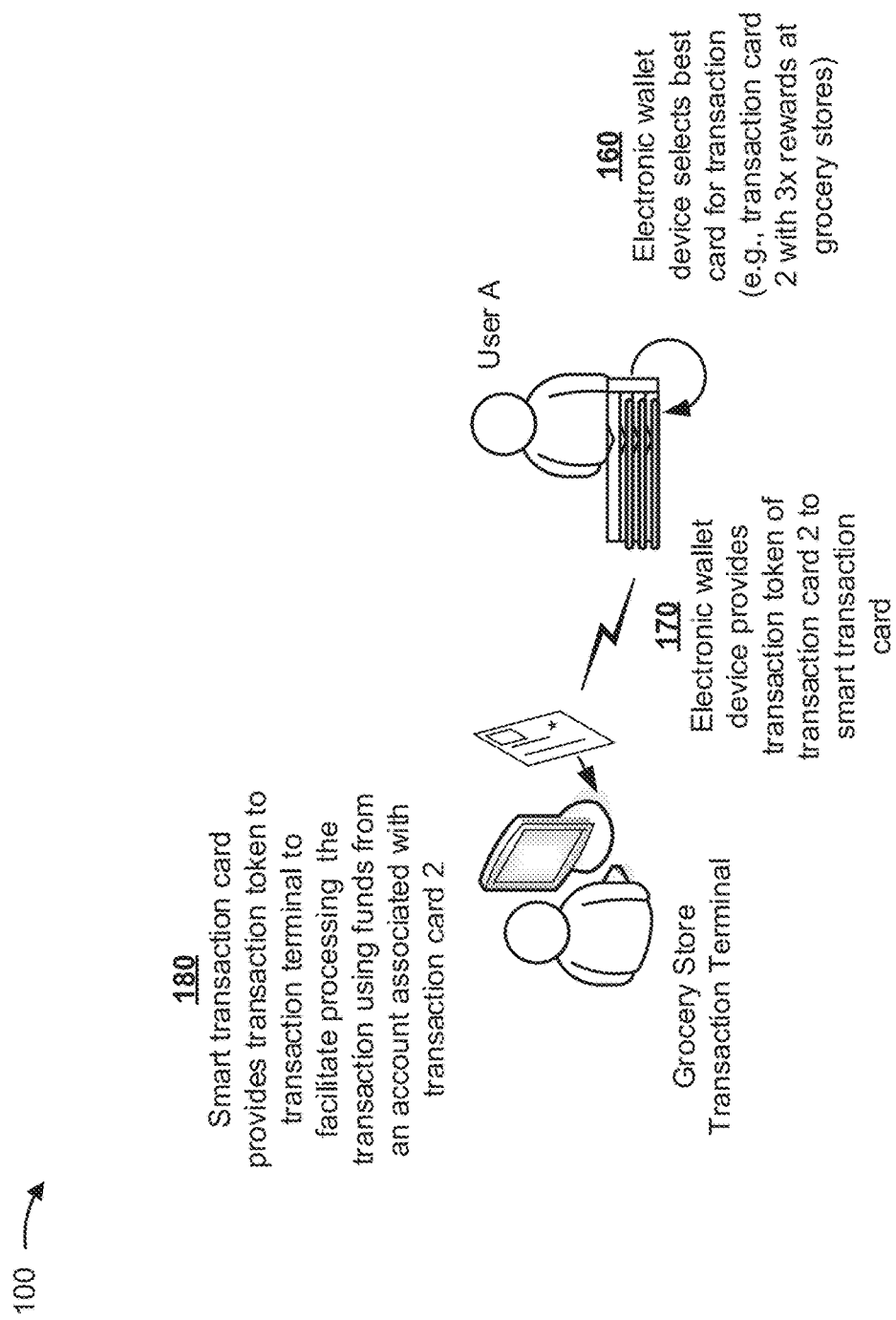

SELECTING A TRANSACTION CARD FOR A TRANSACTION BASED ON CHARACTERISTICS OF THE TRANSACTION

RELATED APPLICATION

This application is a continuation of U.S. patent application Ser. No. 15/725,022, filed Oct. 4, 2017, which is incorporated herein by reference.

BACKGROUND

Transaction cards (e.g., credit cards, debit cards, gift cards, automated teller machine (ATM) cards, rewards cards or client loyalty cards, and/or the like) and/or devices (e.g., a smart transaction card, a smartphone, and/or the like) may be used in transactions to pay for products or services at transaction terminals (e.g., point of sale (PoS) terminals) of individuals or businesses engaged in the sale of goods or services. The transaction cards may include an integrated circuit (IC) chip to improve security with respect to use of the transaction card. Utilizing such "chip cards" requires physically inserting the cards into a card reader. The integrated circuits may include a secure element, which is required in order to validate and/or authenticate a transaction utilizing the chip card. Newer card readers may use contactless technologies, such as near field communication (NFC) or Bluetooth Low Energy (BLE) technologies and/or the like, to allow communications between the transaction terminal and a transaction card, with attendant advantages. Many existing chip cards are not compatible with such contactless payment terminals.

SUMMARY

According to some implementations, an electronic wallet device may include a plurality of card slots configured to hold transaction cards, each card slot, of the plurality of card slots, including a card reader, and the plurality of card slots holding at least two transaction cards; and one or more processors to receive transaction information associated with a transaction at a transaction terminal, select a transaction card, of the at least two transaction cards based on the received transaction information, and/or provide a transaction token, associated with the selected transaction card to be used in connection with the transaction terminal to process the transaction.

According to some implementations, a non-transitory computer-readable medium storing instructions, that, when executed by one or more processors of an electronic wallet device, may cause the one or more processors to receive transaction information associated with a transaction at a transaction terminal; identify a set of candidate transaction cards to be used in the transaction, the set of candidate transaction cards comprising integrated circuit (IC) chips that are communicatively coupled with a card reader of the electronic wallet device; select a transaction card from the set of candidate transaction cards, the transaction card being selected based on card information associated with the set of candidate transaction cards; and/or provide a transaction token, associated with the transaction card, to the transaction terminal.

According to some implementations, a method may include detecting, by an electronic wallet device, a transaction pending at a transaction terminal, the electronic wallet holding at least two transaction cards; selecting, by the electronic wallet, a transaction card from the at least two transaction cards, the transaction card being selected based on at least one of: information associated with the at least two transaction cards, or information associated with the transaction; obtaining, by the electronic wallet device, a transaction token associated with the transaction card; and providing, by the electronic wallet device, the transaction token to the transaction terminal.

BRIEF DESCRIPTION OF THE DRAWINGS

FIGS. 1A-1C are diagrams of an overview of an example implementation described herein;

DETAILED DESCRIPTION

Figure 1B:
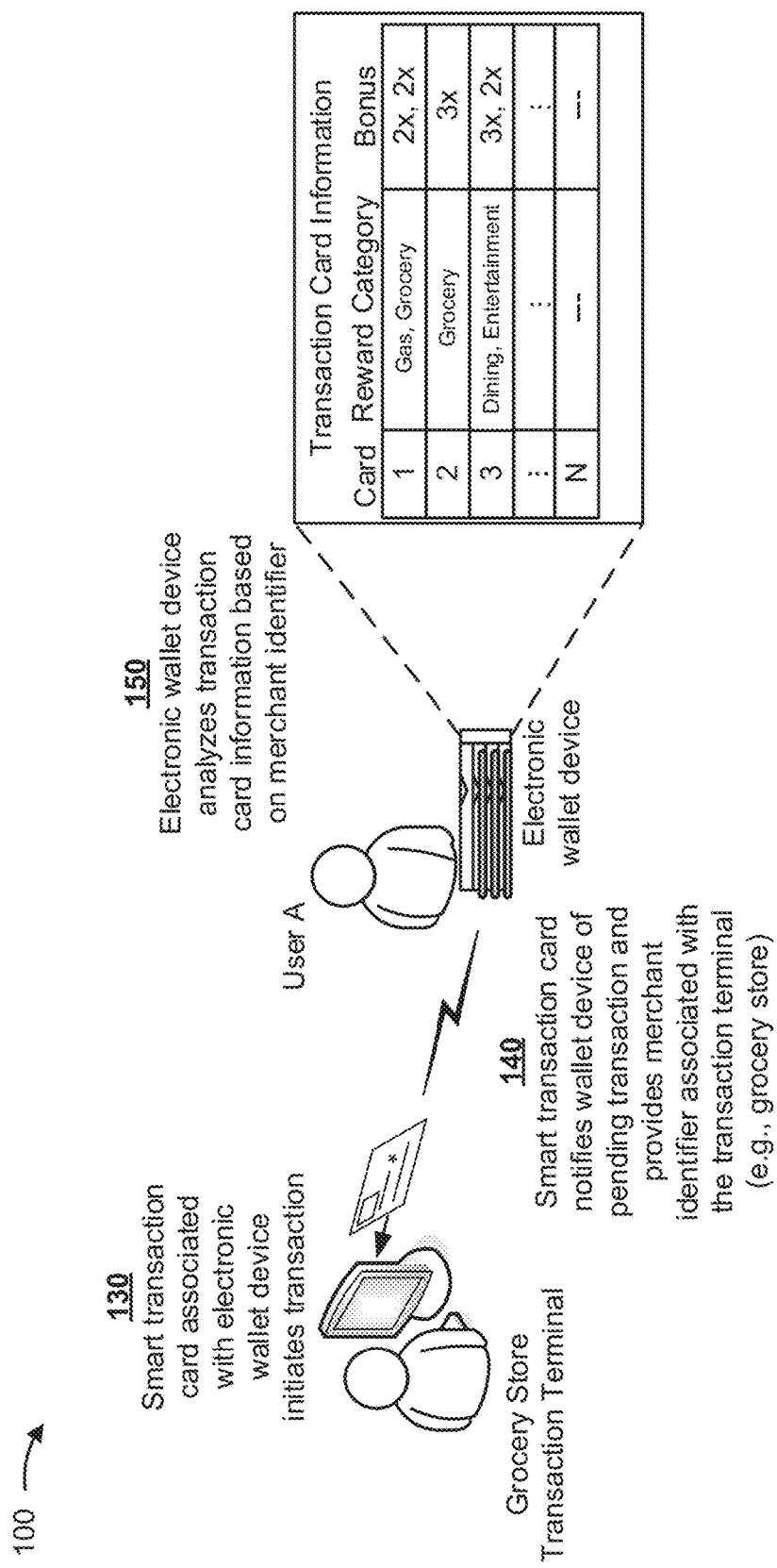

The following detailed description of example implementations refers to the accompanying drawings. The same reference numbers in different drawings may identify the same or similar elements.

Transaction cards may be used to facilitate processing transactions at transaction terminals (e.g., point of sale (PoS) terminals, automated teller machine (ATM) terminals, access terminals (e.g., locking mechanisms for gates, doors, rooms, and/or the like), reward redemption terminals, and/or the like). In many instances, consumers may have accounts with multiple entities (e.g., financial institutions (e.g., banks), merchants, card associations, and/or the like). Accordingly, consumers may carry multiple transaction cards with them while utilizing the transaction cards in transactions (e.g., purchasing goods or services, redeeming loyalty/rewards points, redeeming store credit/gift cards, and/or the like). In some instances, consumers may prefer to use particular cards for particular goods or services of a transaction based on card information associated with the transaction cards (e.g., balance of the account, credit limit of the account, fees associated with the account, rewards opportunities associated with the account, and/or the like) and/or transaction information associated with the transaction (e.g., merchant identifier indicating a type of merchant involved in the transaction, a monetary value of the transaction, location information corresponding to a location of the transaction, a currency used in the transaction, and/or the like).

Some implementations, disclosed herein, provide an electronic wallet device to facilitate processing transactions at a transaction terminal (e.g., a point of sale (PoS) terminal). The electronic wallet device may receive transaction cards (e.g., by a user inserting the transaction cards into card slots of the electronic wallet device) that may be used in the transactions. The electronic wallet device may allow communication of a transaction token from one or more of the transaction cards to the transaction terminal to facilitate the transaction, either directly or indirectly. In some implementations, the electronic wallet device may select a transaction card from a plurality of transaction cards inserted into the electronic wallet device to communicate a transaction token to the transaction terminal for the transaction based on transaction information associated with the transaction terminal, based on card information associated with the transaction card, based on user input, and/or the like.

Accordingly, some implementations described herein enable consumers to utilize a single device (i.e., an electronic wallet device) to facilitate transactions between transaction terminals and a plurality of transaction cards (e.g., rather than the consumer individually selecting and physically using the transaction cards at the transaction terminals). For example, the electronic wallet device may provide or communicate transaction tokens associated with the transactions cards to transaction terminals without consumers removing the transaction cards from the electronic wallet device. Furthermore, some implementations herein may enable a consumer to earn and/or optimize earning additional rewards (e.g., cash back, transaction card reward points (e.g., card branded points), merchant rewards points (e.g., airline miles), and/or the like) and/or avoid transaction fees (e.g., over draft fees, fees for exceeding maximum credit limits, foreign transaction fees, currency exchange fees, and/or the like) by automatically selecting an appropriate transaction card based on transaction information associated with the transaction and/or transaction terminal (e.g., merchant type, transaction type, monetary value of transaction, location information corresponding to a location of transaction, and/or the like) and/or card information associated with the transaction card (e.g., account information, rewards information, and/or the like). Further, some implementations herein may provide an enhanced experience for consumers when engaging in transactions by enabling consumers to avoid selecting a transaction card to be used (which ultimately may not earn the consumers a relative maximum of rewards or prevent the consumers from incurring account fees) in a transaction and/or shuffling through multiple transaction cards and/or personal items to find the selected transaction card. According to some implementations, transaction errors or failures may be avoided using an electronic wallet device as the electronic wallet device may avoid selecting or using transaction cards, for a transaction, that may be declined (e.g., by determining that a particular transaction may result in credit limits of accounts of the transaction cards to be reached or exceeded), thus saving network resources and/or transaction terminal resources.

FIGS. 1A-1C are diagrams of an overview of an example implementation 100 described herein. In example implementation 100 of FIGS. 1A-1C an electronic wallet device is used in a transaction with a transaction terminal. In FIGS. 1A-1C, the electronic wallet device holds transaction cards that may be used in the transaction without being removed from the electronic wallet device.

As shown in FIG. 1A, and by reference number 110, the transaction cards 1-3 are inserted into the electronic wallet device. For example, a consumer may insert the transaction cards into card slots of the electronic device by sliding the transaction cards into the card slots until integrated circuit (IC) chips (e.g., a EUROPAY®, MASTERCARD®, VISA® (EMV) chip) of the transaction cards are in electrical contact with contacts of the electronic wallet device. As shown by reference number 120, information associated with the transaction cards may be obtained by the electronic wallet device. For example, a hub of the electronic wallet device may obtain card information and/or rewards information associated with the transaction card (e.g., rewards earning potential, type of rewards issued (e.g., card branded points, cash back, third party vendor points (e.g., airline miles), and/or the like)), rewards purchase requirements (e.g., minimum purchases or spend minimums), and/or the like). In some implementations, the electronic wallet device may obtain the information from a user input, from a device in communication with the electronic wallet device (e.g., a computer, a smartphone, and/or the like), via a network accessible to the device, via a user input, and/or the like. In some implementations, the electronic wallet device may store the information associated with the transaction cards in the hub.

As shown in FIG. 1B, and by reference number 130, a smart transaction card associated with the electronic wallet device may be used to facilitate processing a transaction at a grocery store transaction terminal. For example, the smart transaction card may be associated with the electronic wallet device by being communicatively coupled with the electronic wallet device (e.g., via a Bluetooth communication link, a Bluetooth low energy (BLE) communication link, a Wi-Fi communication link, and/or the like). The smart transaction card may engage in the transaction via an IC chip of the smart transaction card (e.g., by being inserted into a card reader of the transaction terminal), via a magnetic strip of the smart transaction card (e.g., by being swiped), via a radio frequency (RF) antenna (e.g., via a near field communication (NFC) with the transaction terminal), and/or the like. As shown by reference number 140, the smart transaction card notifies the wallet device of the pending transaction (e.g., via a transaction notification message) and provides a merchant identifier associated with the transaction terminal. For example, the smart transaction card may provide a merchant identifier indicating that the transaction is with a grocery store.

Further, as shown in FIG. 1B and by reference number 150, the electronic wallet device may analyze the card information based on the merchant identifier. In FIG. 1B, example rewards earning information is shown for transaction cards 1-3. The rewards earning information may correspond to rewards that User A may earn when using transaction cards 1-3 in transactions. Bonus rewards are shown as a multiplier of a standard rewards earning. For example, if a standard reward is 1% earnings of the purchase amount at other non-bonus merchants, User A may earn 2% rewards at business identified with a gas and/or grocery merchant identifier using transaction card 1, 3% rewards at businesses with a grocery merchant identifier using transaction card 2, and/or 3% rewards at businesses with a dining merchant identifier or 2% rewards at businesses with an entertainment merchant identifier using transaction card 3. In the illustrated example of FIG. 1B, the electronic wallet device may analyze the reward categories for the transaction cards 1-3 and identify that both transaction cards 1 and 2 provide bonus reward earnings of two times (2×) rewards and three times (3×) rewards for purchases at grocery stores.

As shown in FIG. 1C, and by reference number 160, the electronic wallet device may select a best card for the transaction from transaction cards 1-3. For example, as shown in FIG. 1C, the electronic wallet device may select transaction card 2 because transactions processed using transaction card 2 earns User A three times (3×) rewards at grocery stores and the transaction terminal is at a grocery store. As shown by reference number 170, the electronic wallet device communicates the transaction token of transaction card 2 to the smart transaction card. For example, the electronic wallet device may communicate the transaction token via a communication link with the smart transaction card. As shown by reference number 180, the smart transaction card provides the transaction token to the transaction terminal to facilitate processing the transaction using funds from an account associated with transaction card 2.

As illustrated in example implementation 100 of FIGS. 1A-1C, User A, when purchasing goods and/or services at a transaction terminal, may utilize an electronic wallet to provide a transaction token from a transaction card of the electronic wallet. Furthermore, User A may earn maximum rewards relative to the transaction cards in the electronic wallet device by using the electronic wallet device to select transaction card 2 based on the merchant identifier indicating that the transaction terminal is associated with a grocery store. Accordingly, User A may have an enjoyable transaction experience without needing to determine which transaction card is to be used for a particular transaction or needing to shuffle through User A's multiple transaction cards or personal items to find transaction card 2.

As indicated above, FIGS. 1A-1C are provided merely as an example. Other examples are possible and may differ from what was described with regard to FIGS. 1A-1C.

Figure 2:
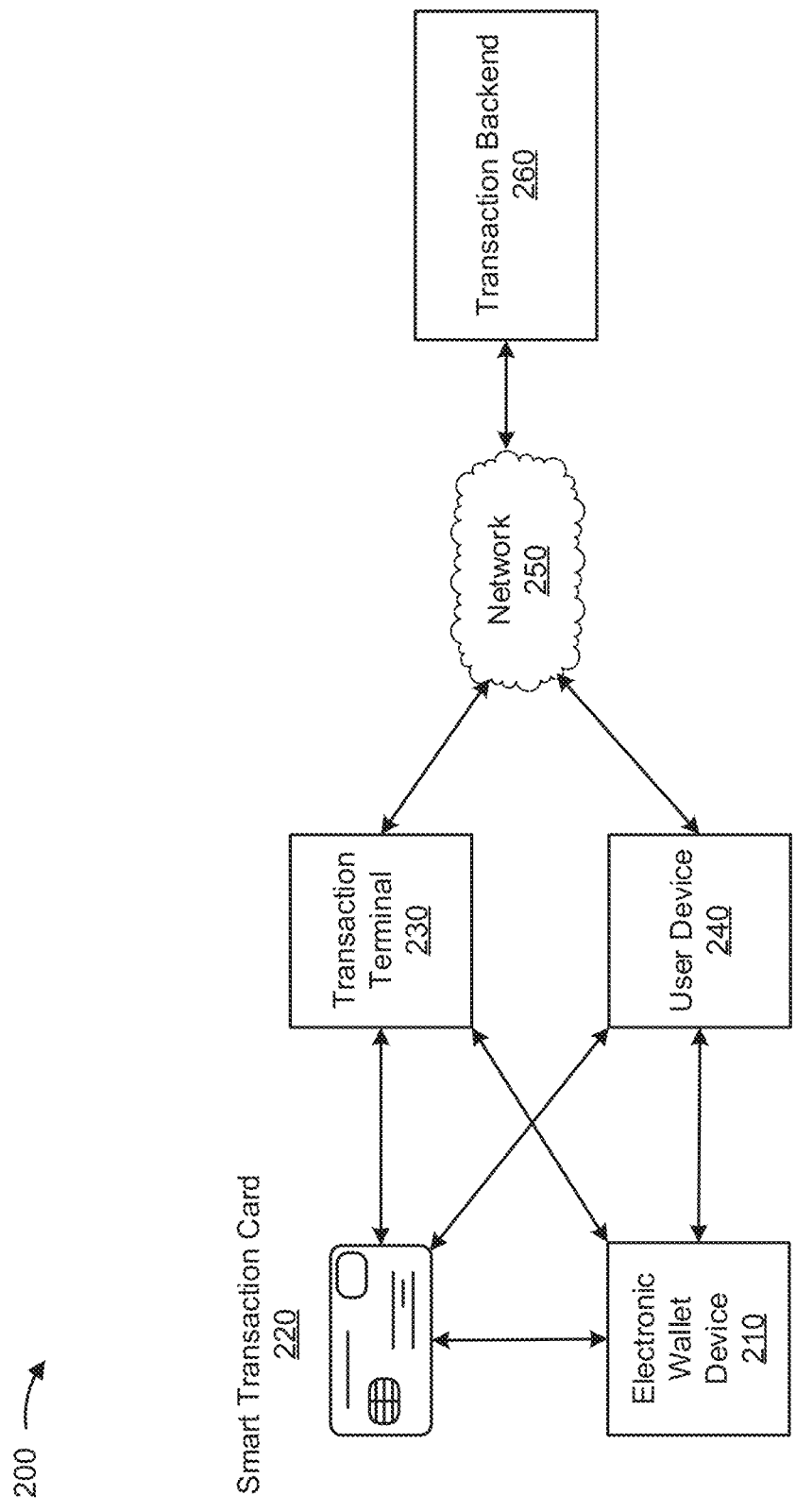
FIG. 2 is a diagram of an example environment in which systems and/or methods, described herein, may be implemented.

FIG. 2 is a diagram of an example environment in which systems and/or methods, described herein, may be implemented. As shown in FIG. 2, environment 200 may include an electronic wallet device 210, a smart transaction card 220, a transaction terminal 230, a user device 240, a network 250, and a transaction backend 260. In environment 200, electronic wallet device 210, smart transaction card 220, transaction terminal 230, and/or user device 240 may communicate data, between one another, that is associated with or related to a transaction with transaction terminal 230, which facilitates processing the transaction through communication with transaction backend 260 via network 250. Devices of environment 200 may interconnect via wired connections, wireless connections, or a combination of wired and wireless connections.

Electronic wallet device 210 includes a device that may receive or dock transaction cards (e.g., credit cards, debit cards, access cards, client loyalty cards, gift cards, and/or the like). Example electronic wallet device 210 may include one or more card slots configured to hold the transaction cards. Each card slot, of the one or more card slots, may include a card reader (e.g., a chip reader). Electronic wallet device 210 may include a switching component that enables electronic wallet device 210 to obtain transaction tokens and/or information (e.g., card identification information) from transaction cards in electronic wallet device 210 and/or provide the transaction tokens and/or information to components of environment 200. An example switching component may include a conductive link (e.g., a trace, a wired connection, and/or the like) and/or one or more switches. In some implementations, electronic wallet device 210 may include a hub with a processor and/or a communication interface. For example, the hub may facilitate communication between electronic wallet device 210 and the components of environment 200. In some implementations, electronic wallet device 210 may be modular in that components of electronic wallet device 210 (e.g., card slots, a hub, a switching component, and/or the like) may be added and/or removed from electronic wallet device 210 to enable electronic wallet device 210 to be adjustable and/or to hold more or less transaction cards, to increase or decrease the functionality of electronic wallet device 210, and/or the like.

Smart transaction card 220 includes a transaction card capable of communicating with the components of environment 200 (e.g., via Bluetooth communication, BLE communication, Wi-Fi communication, NFC session, and/or the like). Smart transaction card 220 is capable of communicating data for a transaction with transaction terminal 230. For example, smart transaction card 220 may communicate data including a transaction token, transaction card identification information (e.g., an account identifier, a cardholder identifier, and/or the like), account information, banking information, transaction information (e.g., a transaction token), and/or the like associated with transaction cards held in electronic wallet device 210. For example, to communicate the data, smart transaction card 220 may include a magnetic strip and/or an integrated circuit (IC) chip (e.g., a EUROPAY®, MASTERCARD®, VISA® (EMV) chip). Smart transaction card 220 may include an antenna to communicate data associated with smart transaction card 220. The antenna may be a passive RF antenna, an active RF antenna, and/or a battery-assisted RF antenna.

In some implementations, smart transaction card 220 may communicate data associated with transaction terminal 230 to electronic wallet device 210 and/or user device 240. For example, after an interaction with transaction terminal 230 that may engage in a transaction (e.g., after smart transaction card 220 is swiped through a magnetic strip reader, after smart transaction card 220 is inserted into a card reader of transaction terminal 230, after smart transaction card 220 has an NFC session with transaction terminal 230, and/or the like), smart transaction card 220 may obtain transaction information from transaction terminal 230. For example, transaction terminal 230 may obtain and/or provide transaction information including information associated with an entity that owns or operates the transaction terminal, such as a merchant identifier, acceptable forms of payment, acceptable types of transaction cards, a monetary value associated with the transaction (e.g., an amount or value of funds to be exchanged in the transaction), a location information corresponding to a location of the transaction (e.g., a geographical region, country, and/or the like) and/or the like. Such transaction information may be used by electronic wallet device 210 to select a transaction card (and/or an account associated with a transaction card) held in electronic wallet device 210 that is to be used in the transaction (e.g., by providing a transaction token to transaction terminal 230).

Transaction terminal 230 includes one or more devices capable of receiving, generating, storing, processing, and/or providing information associated with facilitating a transaction (a PoS transaction). For example, transaction terminal 230 may include a communication device and/or computing device capable of receiving data from smart transaction card 220 and/or a transaction card of electronic wallet device 210 and processing a transaction based on the data. In some implementations, transaction terminal 230 may include a desktop computer, a laptop computer, a tablet computer, a handheld computer, and/or a mobile phone (e.g., a smart phone, a radiotelephone, and/or the like). Transaction terminal 230 may be owned and/or operated by one or more individuals or businesses engaged in a sale of goods or services (e.g., one or more merchants, vendors, service providers, and/or the like). In some implementations, after an interaction with smart transaction card 220 and/or a transaction card, transaction terminal 230 may provide or indicate transaction information associated with a transaction to smart transaction card 220 and/or the transaction card. For example, transaction terminal 230 may indicate a merchant identifier, acceptable forms of payment for the transaction, acceptable types of transaction cards that may be used in the transaction, a monetary value associated with the transaction, a currency used in the transaction, location information corresponding to a location of the transaction, and/or the like.

Transaction terminal 230 includes one or more devices to facilitate processing a transaction via a transaction card and/or smart transaction card 220. Transaction terminal 230 may include a PoS terminal, a security access terminal, an ATM terminal, and/or the like. Transaction terminal 230 may include one or more input devices and/or output devices to facilitate obtaining transaction card data from smart transaction card 220 and/or from an interaction or authorization from a cardholder of smart transaction card 220. Example input devices of transaction terminal 230 may include a number keypad, a touchscreen, a magnetic strip reader, a chip reader, and/or an RF signal reader. A magnetic strip reader of transaction terminal 230 may receive transaction card data as a magnetic strip of smart transaction card 220 is swiped along the magnetic strip reader. A chip reader of transaction terminal 230 may receive transaction card data from an IC chip (e.g., an EMV chip) of smart transaction card 220 when the chip is communicatively coupled with the chip reader. An RF signal reader of transaction terminal 230 may enable contactless transactions from smart transaction card 220 by obtaining transaction card data wirelessly from smart transaction card 220 as smart transaction card 220 comes within a range of transaction terminal 230 that the RF signal reader may detect an RF signal from an RF antenna of smart transaction card 220. Example output devices of transaction terminal 230 may include a display device, a speaker, a printer, and/or the like.

User device 240 includes one or more devices capable of receiving, generating, storing, processing, and/or providing information associated with facilitating a transaction using transaction cards of electronic wallet device 210 in accordance with some implementations herein. For example, user device 240 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 260 includes one or more devices capable of authorizing and/or facilitating a transaction. For example, transaction backend 260 may include one or more servers and/or computers to store and/or provide information (e.g., authorizations, balances, transaction tokens, security information, account information, and/or the like) associated with processing a transaction via transaction terminal 230.

Transaction backend 260 may include one or more devices associated with financial institutions (e.g., banks, credit unions, and/or the like) and/or transaction card associations that authorize the transaction and/or facilitate a transfer of funds or payments between an account of a cardholder of smart transaction card 220 and an account of an individual or business of transaction terminal 230. For example, transaction backend 260 may include one or more devices of one or more issuing financial institutions associated with a cardholder of transaction cards in electronic wallet device 210, one or more devices of one or more acquiring financial institutions (or merchant banks) associated with transaction terminal 230, and/or one or more devices associated with one or more card associations (e.g., VISA®, MASTERCARD®, and/or the like) associated with transaction cards of electronic wallet device 210. Accordingly, in response to receiving transaction card data associated with transaction cards of electronic wallet device 210 from transaction terminal 230, various financial institutions and/or card associations of transaction backend 260 may communicate to authorize the transaction and/or transfer funds between the accounts associated with transaction cards of electronic wallet device 210 and/or transaction terminal 230.

Transaction backend 260 may include one or more devices associated with a rewards program associated with transaction cards in electronic wallet device 210 and/or an entity (e.g., a bank, a merchant, a service provider, a vendor, and/or the like) associated with transaction cards in electronic wallet device 210 and/or an entity associated with transaction terminal 230. For example, transaction backend 260 may authorize earning and/or redeeming of rewards (e.g., rewards points associated with transaction cards in electronic wallet device 210, cash rewards, client loyalty rewards associated with an entity associated with transaction terminal 230, and/or the like) based on a transaction processed by transaction terminal 230 with smart transaction card 220 and/or transaction cards in electronic wallet device 210.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
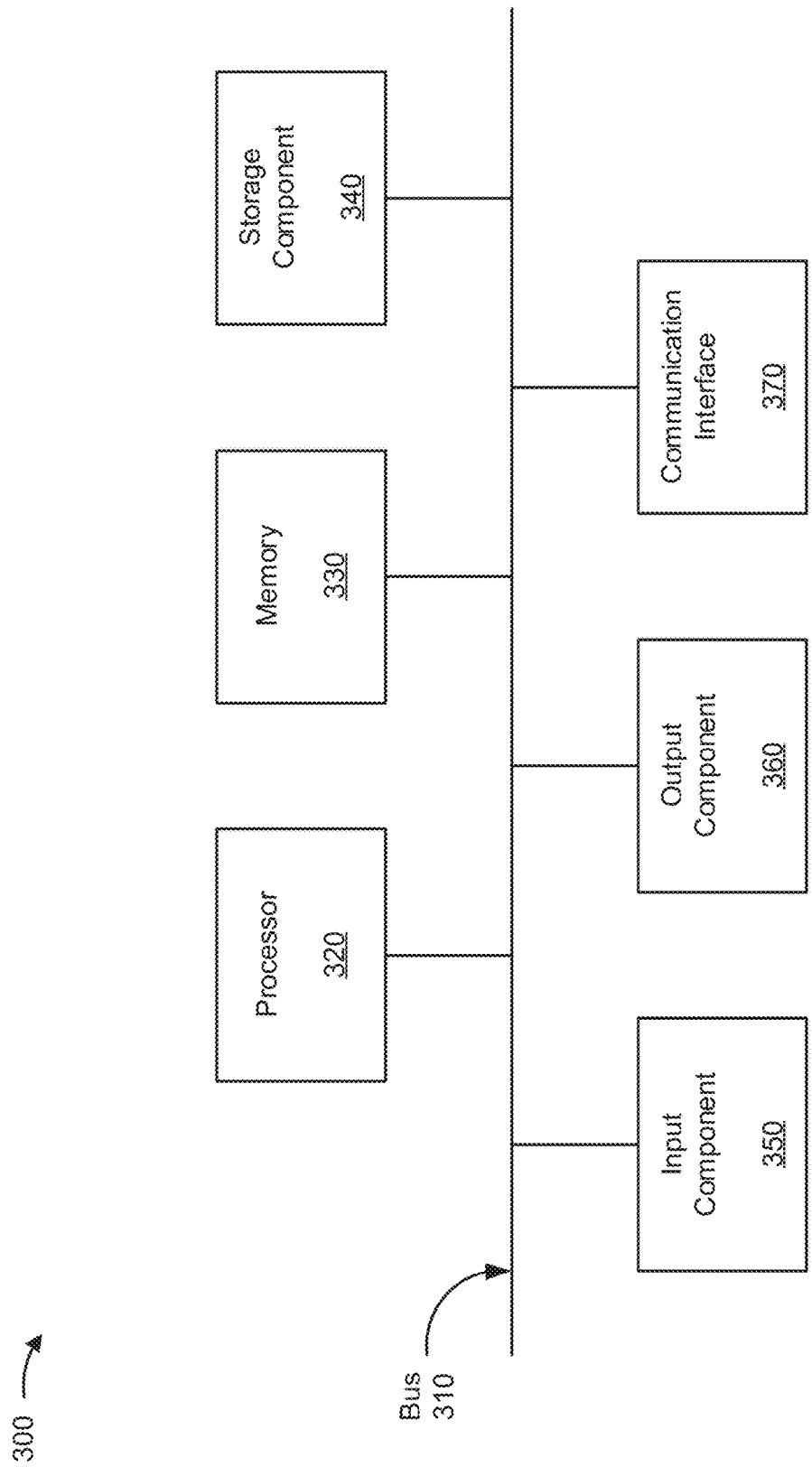
FIG. 3 is a diagram of example components of one or more devices of FIG. 2.

FIG. 3 is a diagram of example components of a device 300. Device 300 may correspond to electronic wallet device 210, smart transaction card 220, transaction terminal 230, user device 240, and/or transaction backend 260. In some implementations, electronic wallet device 210, smart transaction card 220, transaction terminal 230, user device 240, and/or transaction backend 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state memory), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a RF interface, a universal serial bus (USB) interface, a Wi-Fi interface, a cellular network interface, a Bluetooth interface, a BLE interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
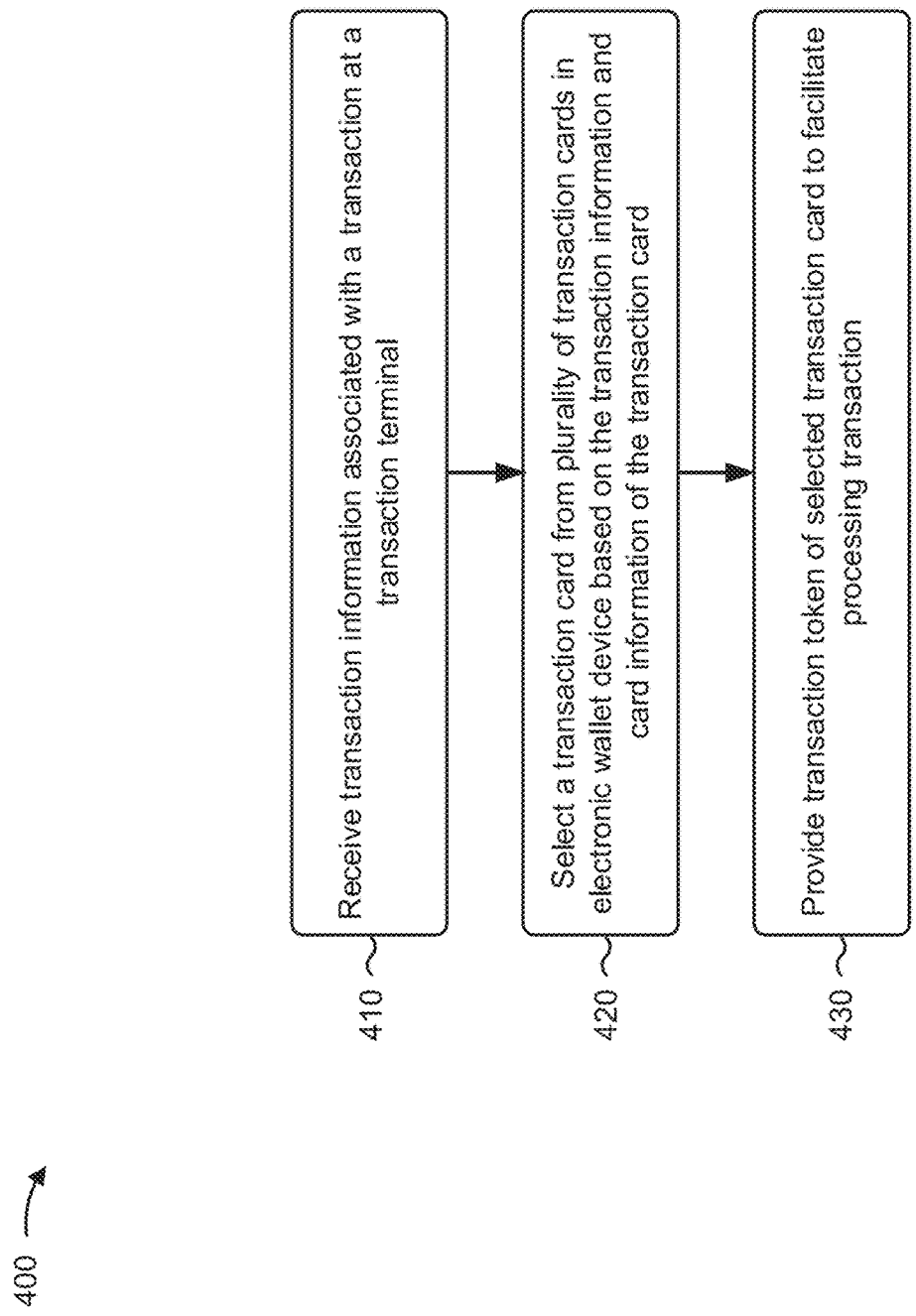
FIG. 4 is a flow chart of an example process that may be implemented in association with an electronic wallet device described herein.

FIG. 4 is a flow chart of an example process 400 that may be implemented in association with an electronic wallet device described herein. In some implementations, one or more process blocks of FIG. 4 may be performed by electronic wallet device 210. In some implementations, one or more process blocks of FIG. 4 may be performed by another device or a group of devices separate from or including electronic wallet device 210, such as smart transaction card 220, transaction terminal 230, user device 240, and/or transaction backend 260.

As shown in FIG. 4, process 400 may include receiving transaction information associated with a transaction at a transaction terminal (block 410). For example, electronic wallet device 210 may receive the transaction information from transaction terminal 230. In some implementations, electronic wallet device 210 may receive the transaction information from smart transaction card 220 and/or user device 240 based on a transaction being initiated at transaction terminal 230.

According to some implementations, electronic wallet device 210, smart transaction card 220, and/or user device 240 may obtain transaction information from transaction terminal 230 via an interaction with transaction terminal 230. For example, electronic wallet device 210, smart transaction card 220, and/or user device 240 may receive transaction information from transaction terminal 230 when placed in communication with transaction terminal 230. Accordingly, electronic wallet device 210 may receive the transaction information directly from transaction terminal 230 (e.g., via a communication interface of electronic wallet device 210) and/or may receive transaction information indirectly from transaction terminal 230 via smart transaction card 220 and/or user device 240.

In some implementations, electronic wallet device 210 may receive the transaction information via a communication interface of the electronic wallet device 210. For example, the communication interface may enable electronic wallet device 210 to communicate with transaction terminal 230, with smart transaction card 220, and/or with user device 240. In some implementations, the communication interface of electronic wallet device 210 may include wired and/or wireless communication interfaces. For example, electronic wallet device 210 may include a terminal interface that includes an IC chip, magnetic strip, RF antenna and/or the like that enables electronic wallet device 210 to communicate with an interface (e.g., a magnetic strip reader, a chip reader, an NFC session terminal, and/or the like) of transaction terminal 230. In some implementations, electronic wallet device 210 may include a wireless communication interface (e.g., a Bluetooth communication interface, a BLE interface, a Wi-Fi interface, an NFC interface, and/or the like) to receive or obtain the transaction information from transaction terminal 230, smart transaction card 220, and/or user device 240.

According to some implementations, the transaction information associated with the transaction may include information associated with an entity that owns and/or operates transaction terminal 230. For example, the transaction information may include a merchant identifier (e.g., information indicating a merchant category associated with transaction terminal 230), acceptable forms of payment for the transaction (e.g., credit payments, debit payments, and/or the like), acceptable types of transaction cards that may be used in the transaction (e.g., acceptable card associations that may be used (e.g., VISA®, MASTERCARD®, AMERICAN EXPRESS®, DISCOVER®, and/or the like)), a monetary value associated with the transaction, a currency used in the transaction, a location information corresponding to a location of the transaction, and/or the like.

In this way, electronic wallet device 210 may receive transaction information associated with a transaction at a transaction terminal that may be used to select a transaction card to be used in the transaction.

As further shown in FIG. 4, process 400 may include selecting a transaction card from a plurality of transaction cards in electronic wallet device based on the transaction information and card information of the transaction card (block 420). For example, electronic wallet device 210 may select the transaction card from transaction cards that are inserted into card slots of electronic wallet device 210. In some implementations, electronic wallet device 210 may select the transaction card based on receiving transaction information (and/or a notification of a pending transaction) from transaction terminal 230.

In some implementations, electronic wallet device 210 may identify the plurality or set of transaction cards based on which card slots of the electronic wallet device 210 include transaction cards. For example, electronic wallet device 210 may determine which card slots of electronic wallet device 210 include transaction cards. Electronic wallet device 210 may determine which card slots are holding transaction cards based on determining whether corresponding card readers in the card slots are communicatively coupled (e.g., in physical contact) with IC chips of transaction cards in the card slots. Accordingly, electronic wallet device 210 may hold transaction cards that are available to be used in a transaction at transaction terminal 230. Further electronic wallet device 210 may identify the transaction cards held by electronic wallet device 210 as a set of candidate transaction cards that may be used in a transaction. When selecting a transaction card from a set of transaction cards or a plurality of transaction cards, electronic wallet device may select at least one of the transaction cards from at least two transaction cards.

In some implementations, electronic wallet device 210 may obtain card information associated with the transaction cards in electronic wallet device 210. For example electronic wallet device 210 may obtain the card information from transaction backend 260 (e.g., via user device 240), from a data structure of electronic wallet device 210, via user input, and/or the like. Card information may include an account identifier (e.g., a name, an account number, and/or the like associated with the account), a card type, a card association, a credit limit, a balance of the account, a type of the account, and/or the like. In some implementations, electronic wallet device 210 may access, via card readers, account information associated with the transaction cards (e.g., account numbers, names, account type, and/or the like) from IC chips of the transaction cards. In such instances, electronic wallet device 210 may use the account information to access rewards information from transaction backend 260. For example, the rewards information may indicate that one or more transaction cards of the plurality of transaction cards may provide a consumer (or cardholder) with a benefit when used in the transaction. In such cases, the consumer may earn rewards points (which may be redeemed in rewards transactions with merchants and/or vendors associated with the transaction cards), cash back, and/or the like.

According to some implementations, electronic wallet device 210 selects a transaction card from the transaction cards in electronic wallet device 210 by analyzing the card information with respect to the transaction information. For example, using a merchant identifier from the transaction information, electronic wallet device 210 may determine which transaction card may provide a greatest benefit (e.g., the most rewards points) to a consumer of the electronic wallet device 210 relative to the other transaction cards. As another example, using acceptable forms of payment (e.g. credit or debit), electronic wallet device 210 may select for use and/or eliminate particular transaction cards from being used in the transaction. More specifically, in such an example, if only debit cards can be accepted by transaction terminal 230, electronic wallet device 210 may select a transaction card that is associated with a debit account of the consumer. Furthermore, in some instances, using acceptable types of transaction cards from the transaction information, electronic wallet device 210 may select for use and/or eliminate particular transaction cards from being used in the transaction. For example, if only VISA® and/or MASTERCARD® transaction cards can be accepted, electronic wallet device 210 may only select the transaction cards from the plurality of transaction cards that include VISA® and MASTERCARDS® and disregard the other transaction cards.

In some implementations, based on the monetary value of the transaction, electronic wallet device 210 may select a transaction card that would not cause an account associated with the transaction card to be over-drafted (e.g., if the transaction card is a debit card) or cause an account balance to exceed a maximum credit limit (e.g., if the transaction card is a credit card). In some implementations, based on an indication of a particular currency used in the transaction and/or location of the transaction, electronic wallet device 210 may select a transaction card that may minimize and/or avoid currency exchange rate fees and/or foreign transaction fees. For example, if using a first transaction card does not cause an account of the first transaction card to be charged currency exchange rate fees or foreign transaction fees while using a second transaction card does cause an account of the second transaction card to be charged currency exchange rate fees and/or foreign transaction fees, electronic wallet device 210 may select the first transaction card to avoid incurring the fees (or at least eliminate the second card as being a candidate transaction card that can be selected).

In some implementations, electronic wallet device 210 may utilize a scoring system to select a transaction card from the plurality of transaction cards based on the transaction information and/or the card information. For example, scores and/or weights may be applied to the transaction information and/or card information. Scores may be calculated for each of the transaction cards in electronic wallet device 210 based on the scoring system, and the transaction card that satisfies a threshold value (e.g., is the greatest value or least value) relative to the others may be selected. Accordingly, an optimal transaction card (i.e., optimal relative to the scoring system) may be selected from the plurality of transaction cards in electronic wallet device 210 for transactions at transaction terminal 230. As an example, a first transaction card that incurs foreign transaction fees may offer three times bonus rewards points for a transaction while a second card that does not include foreign transaction fees may offer two times bonus rewards points. Depending on weighting of a scoring system used to select the transaction card, the first card may be selected for the transaction if rewards information is more weighted than avoiding transaction fees (or foreign transaction fees) or the second card may be selected if avoiding transaction fees is more weighted than rewards information.

Accordingly, electronic wallet device 210 may select a transaction card for use in the transaction at transaction terminal 230 based on transaction information associated with the transaction and/or card information associated with transaction cards in electronic wallet device 210. In this way, electronic wallet device 210 may facilitate processing the transaction by providing a transaction token from the selected transaction card.

As further shown in FIG. 4, process 400 may include providing a transaction token of the selected transaction card to facilitate processing the transaction (block 430). For example, electronic wallet device 210 may provide the transaction token to transaction terminal 230. In some implementations, electronic wallet device 210 may provide the transaction token based on selecting the transaction card for the transaction.

According to some implementations, electronic wallet device 210 may provide the transaction token directly to transaction terminal 230 and/or indirectly to transaction terminal 230 (e.g., via smart transaction card 220 and/or user device 240). For example, electronic wallet device 210 may provide the transaction token via a terminal interface of electronic wallet device 210 and/or via a wireless communication interface of electronic wallet device 210. Accordingly, electronic wallet device 210 may communicate the transaction token to transaction terminal 230, such that transaction terminal 230 may process the transaction.

In some implementations, electronic wallet device 210 obtains the transaction token from the transaction card via a card reader of electronic wallet device 210 in communication with the transaction card. For example, a card reader of electronic wallet device 210 may obtain the transaction token from an IC chip of the transaction card and forward the transaction token to the transaction terminal 230. A transaction token may be any key, code, or security data used to facilitate processing a transaction. For example, the transaction token may be an encrypted key that authorizes a transfer of funds through transaction backend 260 (e.g., from a financial institution of a consumer associated with electronic wallet device 210 to a financial institution associated with an entity of transaction terminal 230).

In this way, electronic wallet device 210 may be used to select a transaction card from a plurality of transaction cards that may be used to process a transaction at transaction terminal 230 based on information associated with transaction terminal 230 and/or the plurality of transaction cards. Accordingly, the transaction card may be used in connection with transaction terminal to process the transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
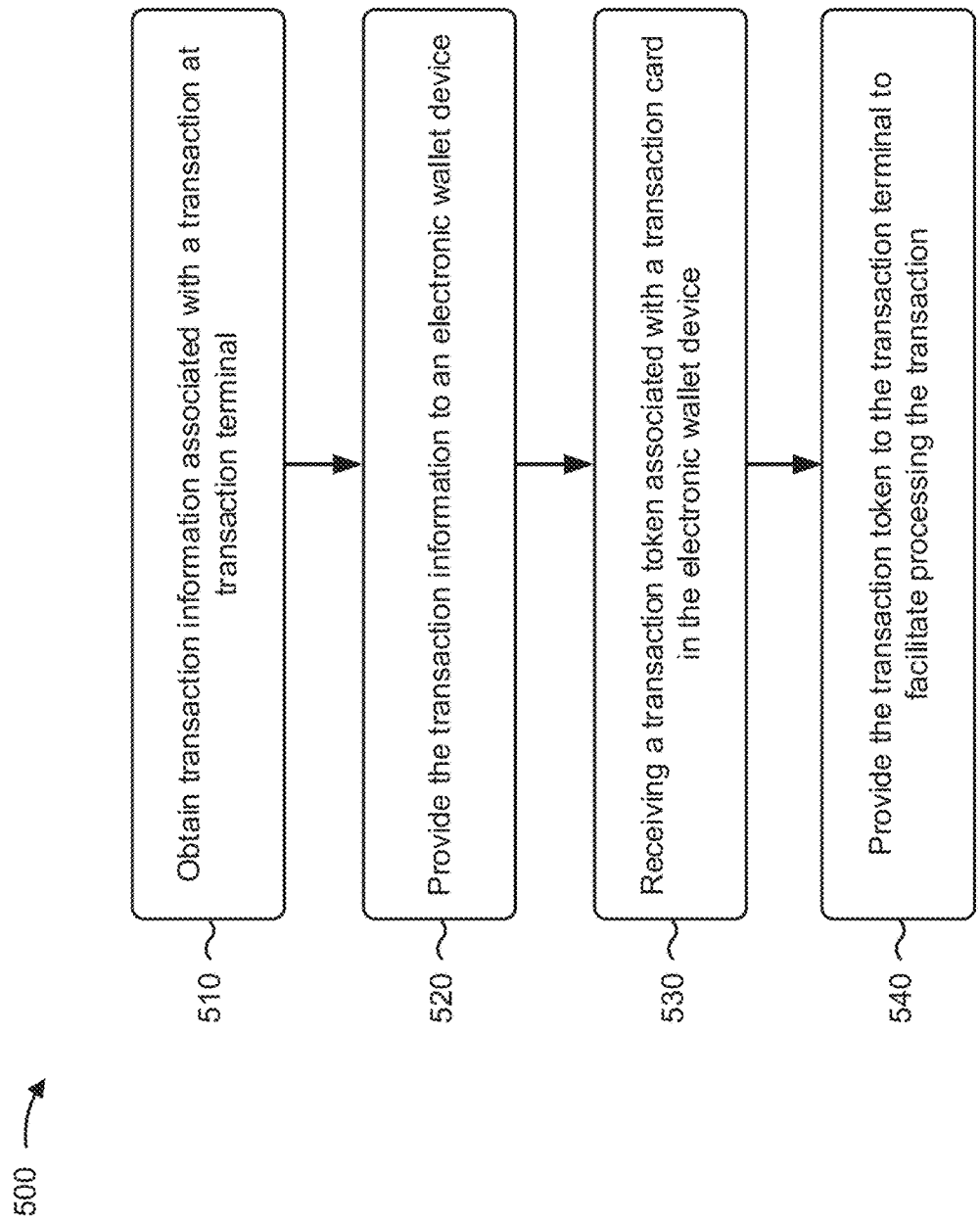
FIG. 5 is a flow chart of an example process that may be implemented in association with a smart transaction card and an electronic wallet device described herein.

FIG. 5 is a flow chart of an example process 500 that may be implemented in association with a smart transaction card and an electronic wallet device described herein. In some implementations, one or more process blocks of FIG. 5 may be performed by smart transaction card 220. In some implementations, one or more process blocks of FIG. 5 may be performed by another device or a group of devices separate from or including smart transaction card 220, such as electronic wallet device 210, transaction terminal 230, user device 240, and/or transaction backend 260.

As shown in FIG. 5, process 500 may include obtaining transaction information associated with a transaction at a transaction terminal (block 510). For example, smart transaction card 220 may obtain the transaction information. In some implementations, smart transaction card 220 obtains the transaction information based on detecting an interaction with transaction terminal 230, such as smart transaction card 220 detecting that smart transaction card 220 has been inserted into a chip reader of transaction terminal 230 or smart transaction card 220 is within range to hold an NFC session with transaction terminal 230.

As described above, the transaction information may include a merchant identifier, information indicating acceptable forms of payment, information indicating acceptable types of transaction cards, a monetary value of the transaction, a currency of the transaction, a location of the transaction, and/or the like. Smart transaction card 220 may obtain the transaction information by transaction terminal 230 indicating or providing the transaction information to smart transaction card 220 based on the interaction with smart transaction card 220.

In this way, smart transaction card 220 may obtain transaction information associated with a transaction from transaction terminal 230.

As further shown in FIG. 5, process 500 may include providing the transaction information to an electronic wallet device (block 520). For example, smart transaction card 220 may provide the transaction information to the electronic wallet device 210. In some implementation, smart transaction card 220 may provide the transaction information to electronic wallet device 210 based on obtaining the transaction information.

According to some implementations, smart transaction card 220 may provide the transaction information to electronic wallet device 210 via a communication link. For example, smart transaction card 220 may provide the transaction information via a Bluetooth communication link, a BLE communication link, a Wi-Fi communication link, an NFC session, and/or the like. In some implementations, smart transaction card 220 may provide the transaction information to electronic wallet device 210 via a network (e.g., network 250). For example, electronic wallet device 210 may be at a first location (e.g., a consumer's home) and smart transaction card 220 may be at a second location (e.g., a merchant). In such an example, smart transaction card 220 may send the transaction information through one or more networks to electronic wallet device 210 (which may then respond through the network with a card selection notification and/or transaction token).

In some implementations, smart transaction card 220 may request electronic wallet device 210 to provide a transaction token based on the obtained transaction information. For example, smart transaction card 220 may send a request message that include the obtained transaction information.

In this way, smart transaction card 220 may provide the transaction information to electronic wallet device 210 to enable electronic wallet device 210 to provide a transaction token for the transaction.

As further shown in FIG. 5, process 500 may include receiving a transaction token associated with a transaction card in the electronic wallet device (530). For example, smart transaction card 220 may receive the transaction token from electronic wallet device 210. In some implementations, smart transaction card 220 may receive the transaction token from electronic wallet device 210 based on electronic wallet device 210 receiving the transaction information and/or selecting a transaction card to be used to facilitate processing the transaction.

As described in some implementations herein, the transaction card may be selected by electronic wallet device 210 based on the transaction information and/or card information. Accordingly, after selecting the transaction card, electronic wallet device 210 may obtain the transaction token from the transaction card and send the transaction token to smart transaction card 220.

In this way, smart transaction card 220 may receive a transaction token associated with a transaction card in electronic wallet device 210 to enable smart transaction card 220 to provide the transaction token to transaction terminal 230 to facilitate processing the transaction.

As further shown in FIG. 5, process 500 may include providing the transaction token to the transaction terminal to facilitate processing the transaction (block 540). For example, smart transaction card 220 may provide the transaction token to transaction terminal 230. In some implementations, smart transaction card 220 may provide the transaction token to the transaction terminal 230 based on receiving the transaction token from electronic wallet device 210.

In some implementations, smart transaction card 220 may provide the transaction token to transaction terminal 230 via a chip reader of transaction terminal 230. For example, smart transaction card 220 may communicate the transaction token via an IC chip of smart transaction card 220 that is communicatively coupled (e.g., in physical contact) with the chip reader of transaction terminal 230. Accordingly, in some implementations, smart transaction card 220 may be inserted into a chip reader of transaction terminal 230 to engage in a transaction, retrieve and provide the transaction information, and remain in transaction terminal 230 at least until the transaction is processed by transaction terminal 230 using the received and provided transaction token from the transaction card of electronic wallet device 210.

In this way, smart transaction card 220 may facilitate processing a transaction at transaction terminal 230 using a transaction token from one or more transaction cards of electronic wallet device 210.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
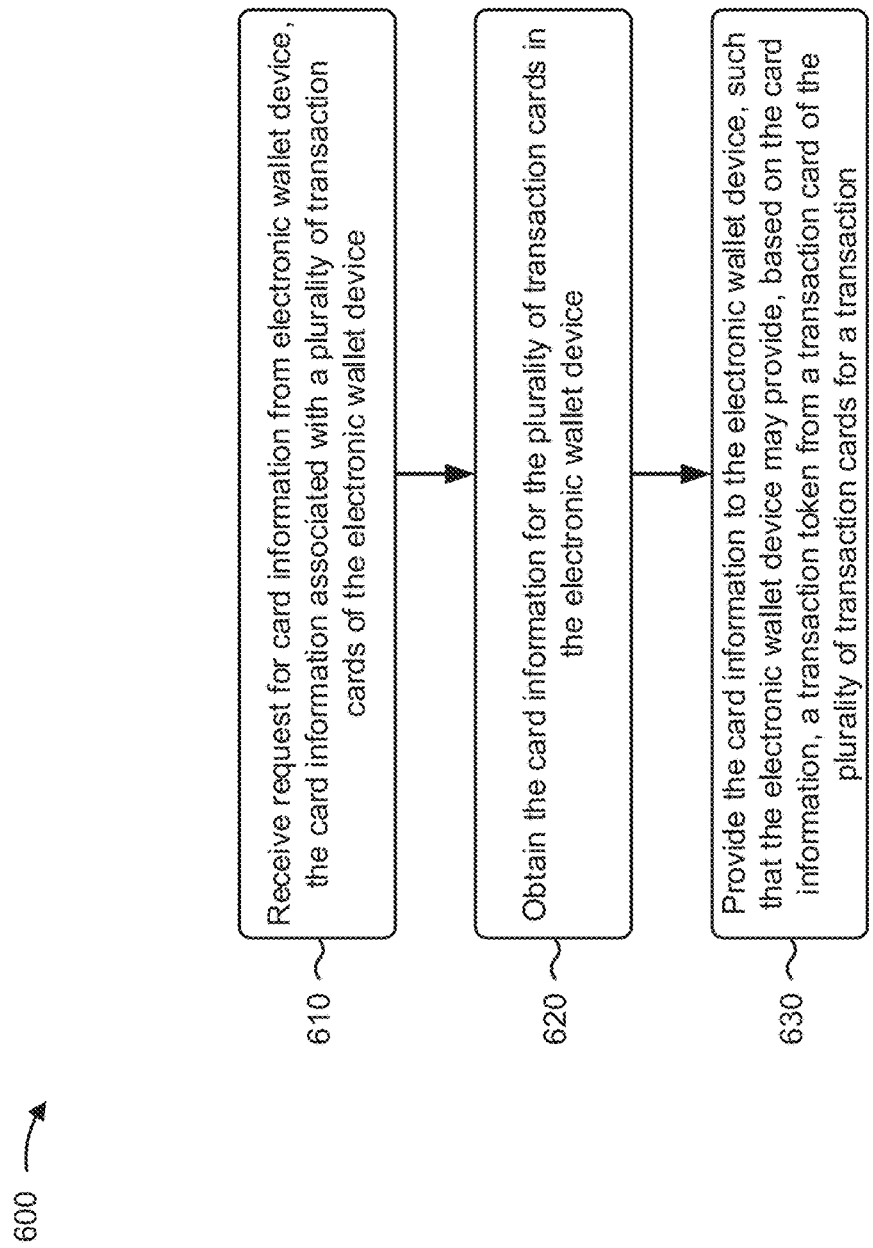
FIG. 6 is a flow chart of an example process that may be implemented in association with a user device and an electronic wallet device described herein.

FIG. 6 is a flow chart of an example process 600 that may be implemented in association with a user device and an electronic wallet device described herein. In some implementations, one or more process blocks of FIG. 6 may be performed by user device 240. In some implementations, one or more process blocks of FIG. 6 may be performed by another device or a group of devices separate from or including user device 240, such as electronic wallet device 210, smart transaction card 220, transaction terminal 230, and/or transaction backend 260.

As shown in FIG. 6, process 600 may include receiving a request for card information from an electronic wallet device where the card information is associated with a plurality of transaction cards of the electronic wallet device (block 610). For example, user device 240 may receive the request for the card information from electronic wallet device 210. In some implementations, user device 240 may receive the card information from electronic wallet device 210 in response to a transaction being initiated or pending at transaction terminal 230.

User device 240 may receive the request via a communication link between user device 240 and electronic wallet device 210. The example request may be a message, data packet, and/or the like providing card identification information associated with the transaction cards in electronic wallet device 210. For example, the card identification information may include an account number, a financial institution identifier, a card type identifier, a brand or name of the transaction card, and/or the like.

As described herein, the card information may include account information (e.g., financial institution information, balances, account identifiers, credit limits, and/or the like) and/or rewards information (e.g., rewards earning potential, type of rewards issued (e.g., card branded points, cash back, third party vendor points (e.g., airline miles), and/or the like)), rewards purchase requirements (e.g., minimum purchases or spend minimums), and/or the like) associated with the transaction cards in electronic wallet device 210.

In this way, user device 240 may receive a request for card information for the transaction cards in electronic wallet device 210 to cause user device 240 to obtain the card information (e.g., from transaction backend 260).

As further shown in FIG. 6, process 600 may include obtaining the card information for the plurality of transaction cards in the electronic wallet device (block 620). For example, user device 240 may obtain the card information for the plurality of transaction cards. In some implementations, user device 240 obtains the card information based on receiving the request from electronic wallet device 210.

According to some implementations, user device 240 may obtain the card information for the plurality of transaction cards in the electronic wallet device from transaction backend 260. For example, user device 240 may access devices (e.g., servers, computers, databases, and/or the like) of financial institutions, via transaction backend 260, that are associated with the plurality of transaction cards. Such devices may include data structures (e.g., databases, tables, indexes, and/or the like) that store card information associated with accounts of consumers that are associated with the financial institution (e.g., consumers that have opened a savings account, a checking account, a credit card account, and/or the like). Furthermore, such devices may include data structures that store rewards information associated with the transaction cards. Such rewards information may include rewards earning rates, rewards earning requirements (e.g., minimum or maximum spend for earning rewards, minimum or maximum number of transactions, and/or the like) or thresholds, rewards redemption opportunities, values of rewards units, and/or the like.

In some implementations, user device 240 may store the card information. For example, user device 240 may store the card information in a data structure of user device 240. In such cases, the card information may be downloaded and/or installed on the user device 240 (e.g., from a website, via user input, via an application, and/or the like).

In this way, user device 240 may obtain card information from the plurality of transaction cards from transaction backend 260 that can be provided to electronic wallet device 210.

As further shown in FIG. 6, process 600 may include providing the card information to the electronic wallet device, such that the electronic wallet device may provide, based on the card information, a transaction token from a transaction card of the plurality of transaction cards for a transaction (block 630). For example, user device 240 may provide the card information to electronic wallet device 210. In some implementations, user device 240 may provide the card information to electronic wallet device 210 based on obtaining the card information and/or receiving the request for the card information from electronic wallet device 210. According to some implementations, user device 240 may provide the card information to electronic wallet device 210 via a communication link (e.g., a Bluetooth communication link, a BLE link, an NFC session link, a Wi-Fi communication link, and/or the like).

User device 240 may provide the card information to electronic wallet device 210 to enable electronic wallet device 210 to select a transaction card, for a transaction, from the plurality of transaction cards in electronic wallet device 210 according to some implementations described herein. For example, the card information may include account information and/or rewards information that electronic wallet device 210 may use to select a transaction card (and corresponding transaction token) from the plurality of transaction cards for a transaction.

Additionally, or alternatively, user device 240 may select the transaction card based on the card information and/or transaction information received from transaction terminal 230. For example, based on user device 240 interacting with transaction terminal 230 (e.g., via an NFC session) to engage in a transaction, user device 240 may select the transaction card and provide the card information (e.g., card identification information) with a request that electronic wallet device 210 provide a transaction token, associated with the selected transaction card indicated in the card information, to user device 240. Accordingly, user device 240 may process the transaction using the transaction token received from electronic wallet device 210.

In this way, user device 240 may be used in association with electronic wallet device 210 to facilitate processing a transaction at transaction terminal 230 according to some implementations described herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
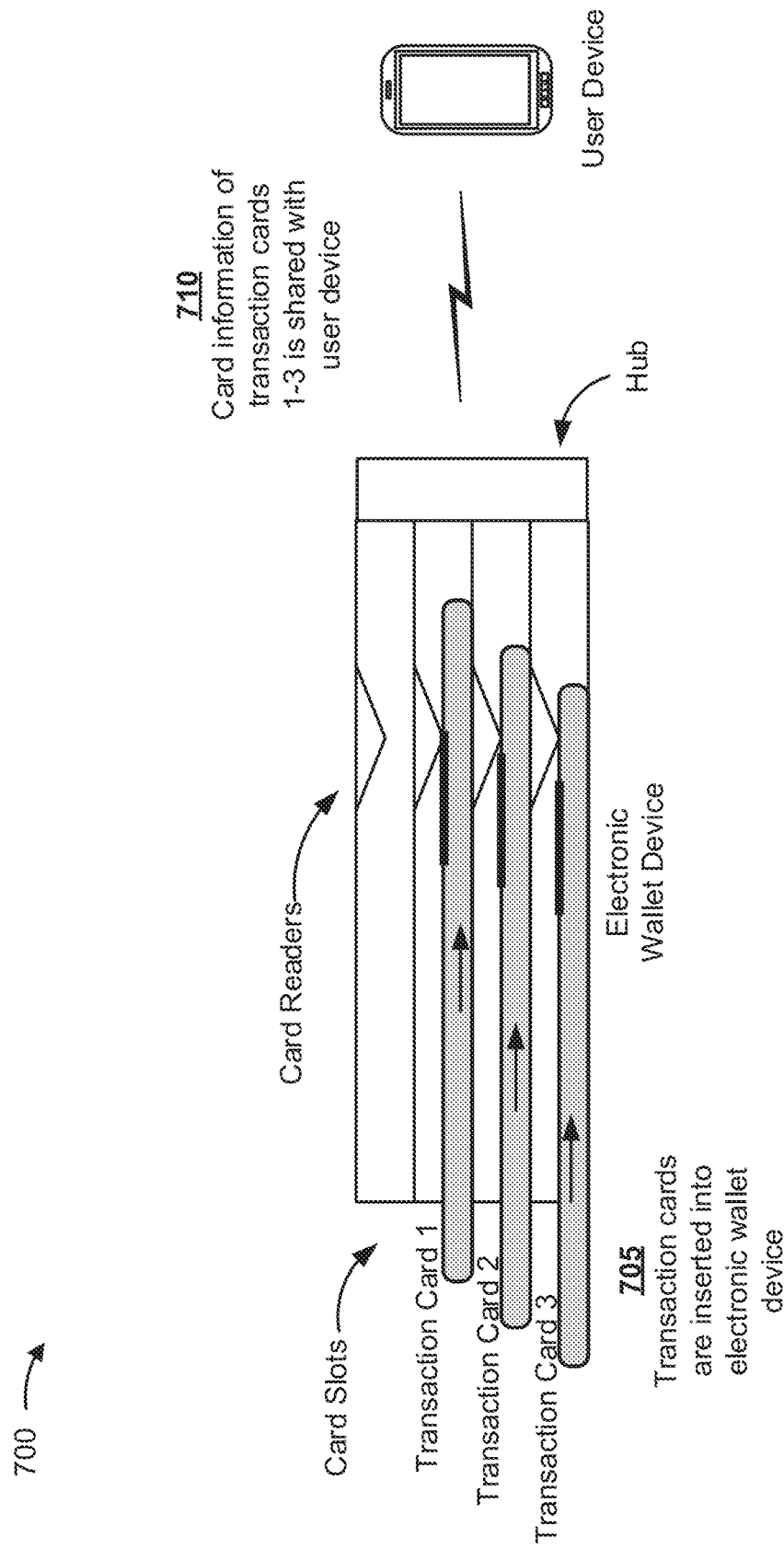
FIGS. 7A-7C are diagrams of an example implementation relating to example processes shown in FIGS. 4, 5, and/or 6.
Figure 7B:
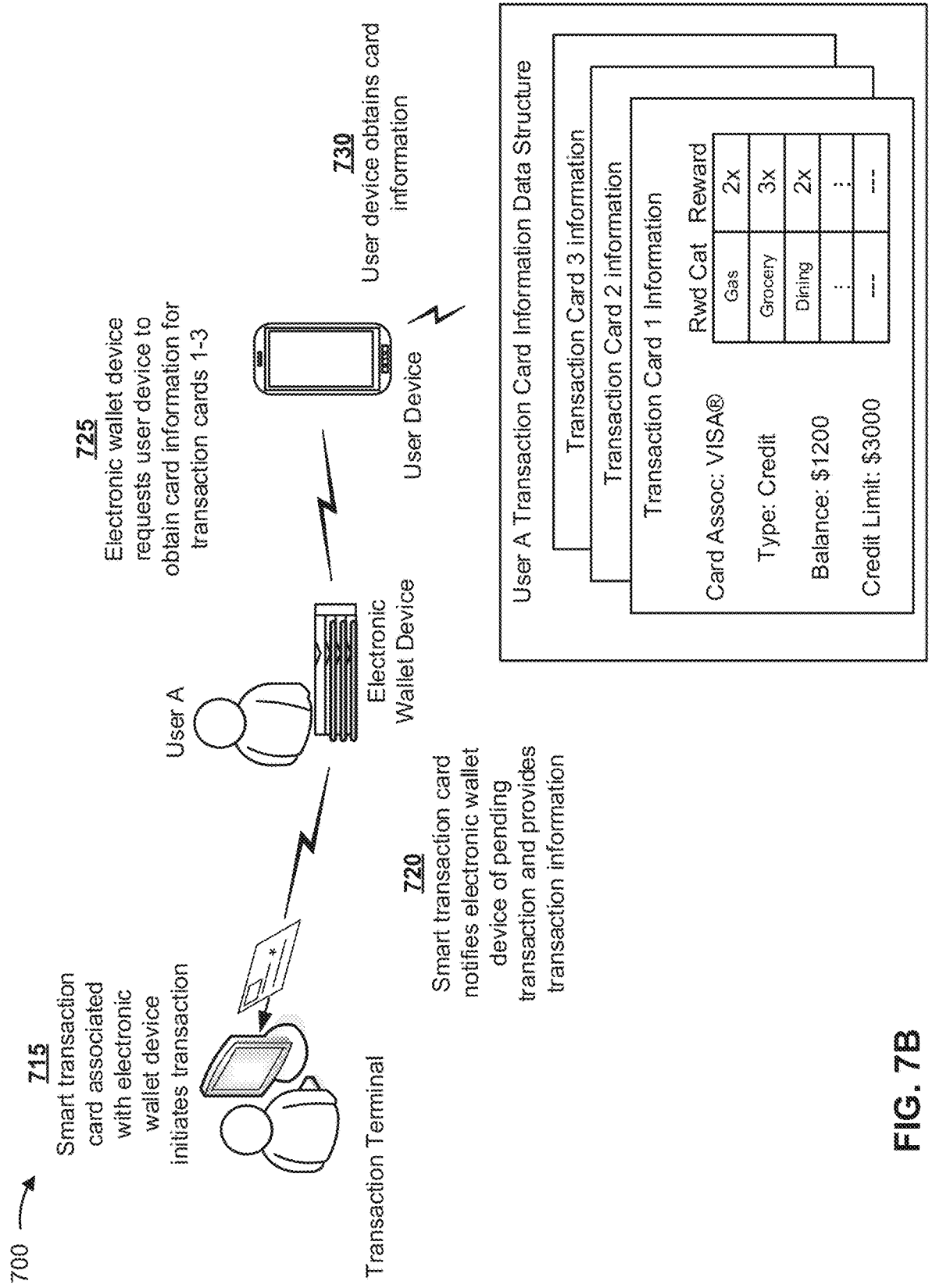
Figure 7C:
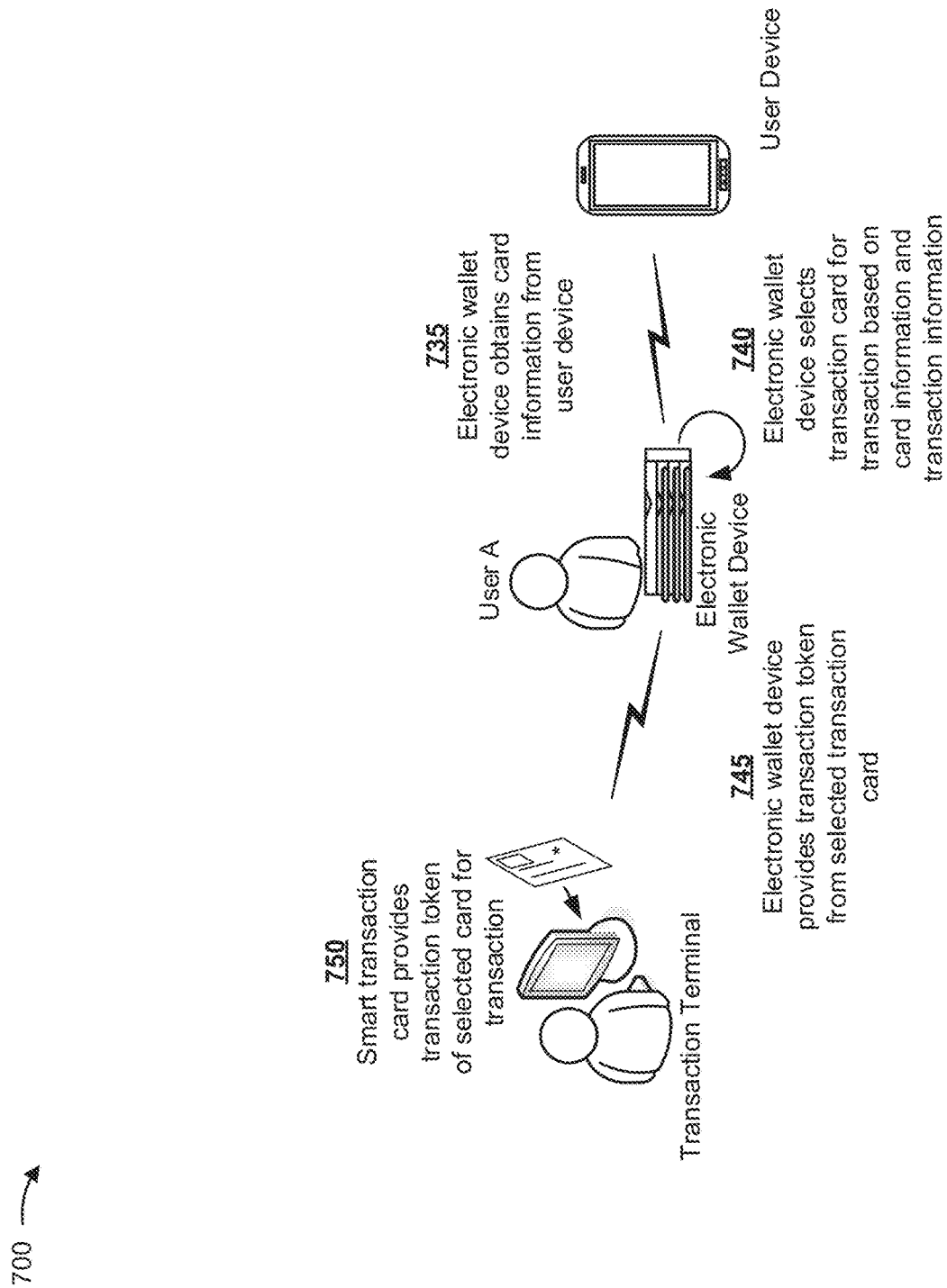

FIGS. 7A-7C are diagrams of an example implementation 700 relating to example processes 400, 500, and/or 600 shown in FIGS. 4, 5, and/or 6, respectively. FIGS. 7A-7C show an example of using an electronic wallet device and a user device to facilitate processing a transaction with a smart transaction card according to some implementations herein.

As shown in FIG. 7A, and by reference number 705, transaction cards 1-3 are inserted into an electronic wallet device. The electronic wallet device may share card information of transaction cards 1-3 with a user device, as shown by reference number 710. For example, electronic wallet device may share an account identifier (e.g., an account number), card expiration information, a card verification number, and/or the like with the user device.

As shown in FIG. 7B, and by reference number 715, a smart transaction card associated with the electronic wallet device engages in a transaction at a transaction terminal. The smart transaction card may notify the electronic wallet device of a pending transaction (or an initiated transaction) and provides transaction information to the electronic wallet device, as shown by reference number 720. Further, in FIG. 7B, as shown by reference number 725, the electronic wallet device requests the user device to obtain card information for transaction cards 1-3 in the electronic wallet.

The user device obtains the card information from a data structure that includes card information for the transaction cards in the electronic wallet device of User A, as shown by reference number 730. In some implementations, the data structure may include one or more data structures of financial institutions that issued and/or are associated with transaction cards 1-3. Additionally, or alternatively, the data structure may be a data structure associated with the electronic wallet device of example implementation 700. For example, portions of storage or memory of the data structure may be allocated for storing card information associated with transaction cards stored in the electronic wallet device. The example card information may be retrieved via the user device using an application of the user device (e.g., an application designed to service as an interface between the electronic wallet device and data structure).

As shown in FIG. 7C, and by reference number 735, the electronic wallet device obtains the card information from the user device. For example, the user device may forward and/or send the card information to the electronic wallet device. The electronic wallet device may select the transaction card for the transaction based on the card information and the transaction information, as shown by reference number 740. In FIG. 7C, as shown by reference number 745, the electronic wallet device provides a transaction token from the selected transaction card to the smart transaction card. The smart transaction card then provides the transaction token of the selected card to the transaction terminal, as shown by reference number 750.

Accordingly, a user device may be used in accordance with an electronic wallet device to obtain card information. In such cases, the electronic wallet device may use the card information (along with transaction information) to select a transaction card for a transaction according to some implementations described herein.

As indicated above, FIGS. 7A-7C are provided merely as an example. Other examples are possible and may differ from what was described with regard to FIGS. 7A-7C.

Figure 8A:
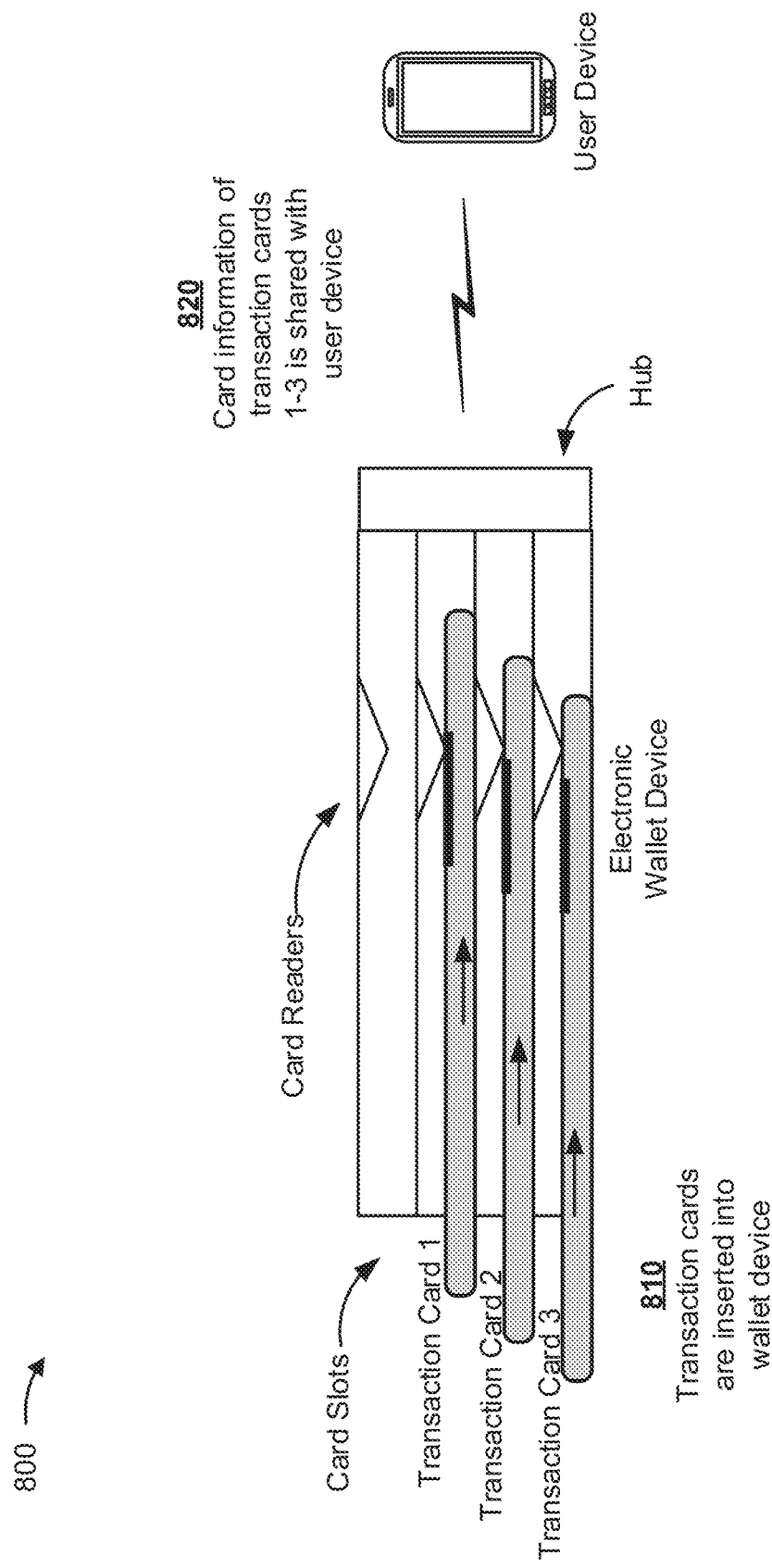
FIGS. 8A-8C are diagrams of an example implementation relating to example processes shown in FIGS. 4, 5, and/or 6.
Figure 8B:
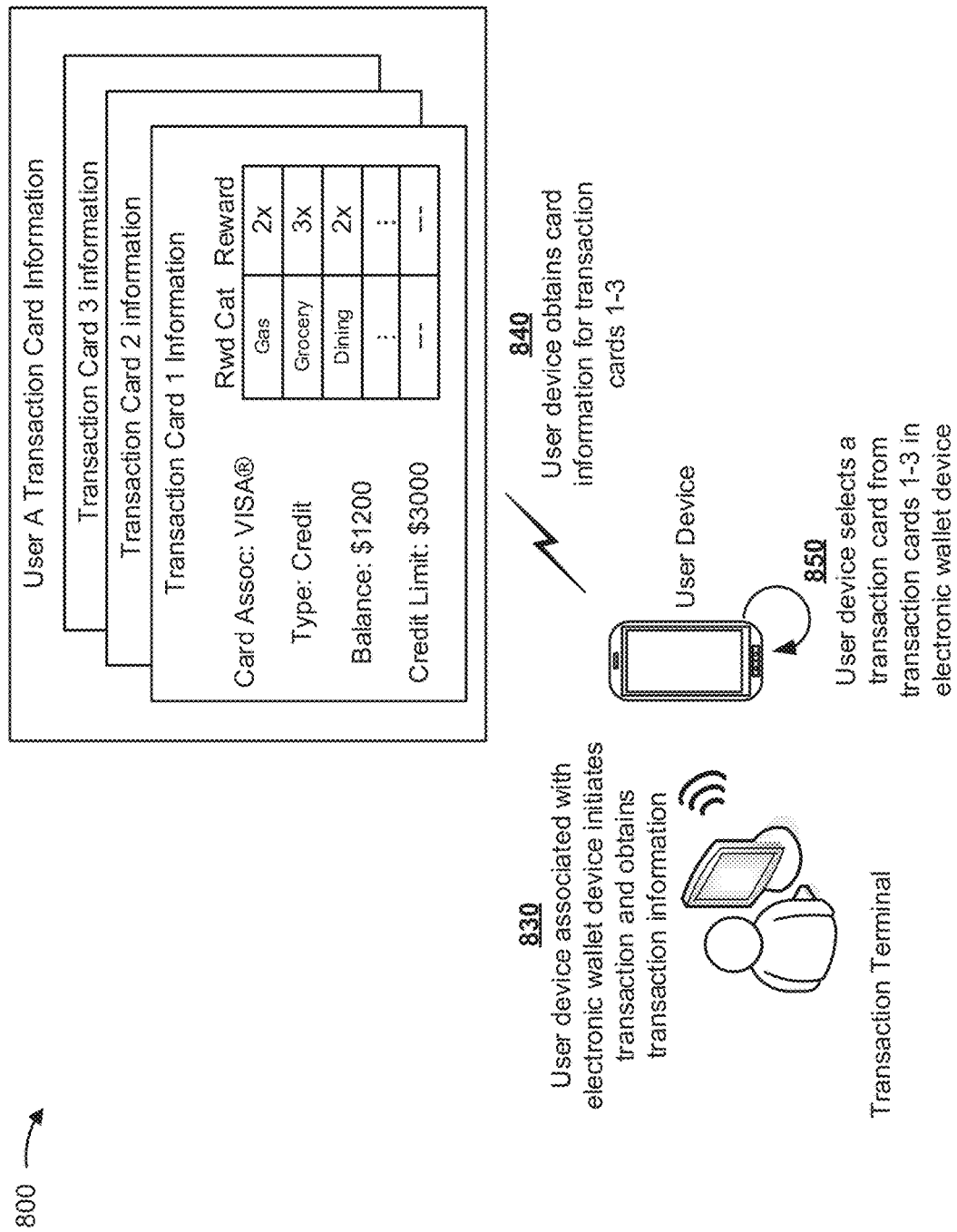
Figure 8C:
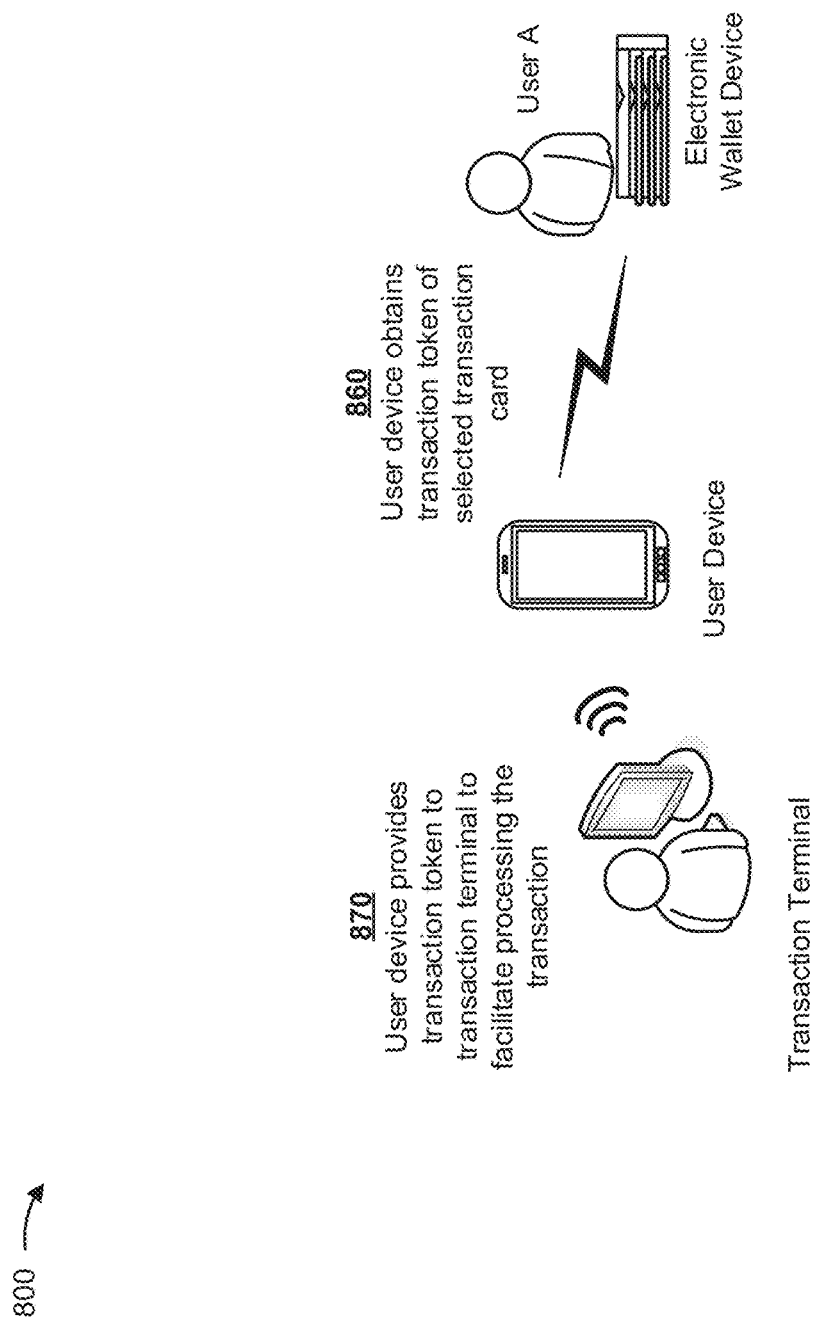

FIGS. 8A-8C are diagrams of an example implementation 800 relating to example processes 400, 500, and/or 600 shown in FIGS. 4, 5, and/or 6, respectively. FIGS. 8A-8C show an example of using an electronic wallet device and a user device to facilitate processing a transaction according to some implementations herein.

As shown in FIG. 8A, and by reference number 810, transaction cards 1-3 are inserted into an electronic wallet device. The card information of transaction cards 1-3 is shared with the user device, as shown by reference number 820.

As shown in FIG. 8B, and by reference number 830, the user device associated with the electronic wallet device engages in a transaction with a transaction terminal and obtains transaction information. For example, the user device may interact with the transaction terminal via an NFC session to engage in the transaction. As shown by reference number 840 in FIG. 8B, the user device obtains card information for transaction cards 1-3. The user device selects the transaction card from the plurality of transaction cards in the electronic wallet based on the card information and transaction information, as shown by reference number 850.

As shown in FIG. 8C, and by reference number 860, the user device obtains a transaction token of the selected transaction card from the electronic wallet device. For example, the user device may send a request to electronic wallet device for a transaction token from the transaction card selected from transaction cards 1-3. In such an example, the electronic wallet device may obtain the transaction token from the selected transaction card (e.g., via an IC chip of the transaction card), and send the transaction token to the user device. As shown by reference number 870 of FIG. 8C, the user device may provide the transaction token to the transaction terminal to facilitate processing the transaction. In some implementations, the user device may provide the transaction token to the transaction terminal via an NFC session (e.g., via a same or separate NFC session that was used to engage in the transaction and obtain the transaction information).

Accordingly, a user device may select a transaction card from transaction cards in an electronic wallet device to facilitate processing a transaction. The user device may select the transaction card based on card information associated with the transaction card and/or transaction information according to some implementations described herein.

As indicated above, FIGS. 8A-8C are provided merely as an example. Other examples are possible and may differ from what was described with regard to FIGS. 8A-8C.

Figure 9:
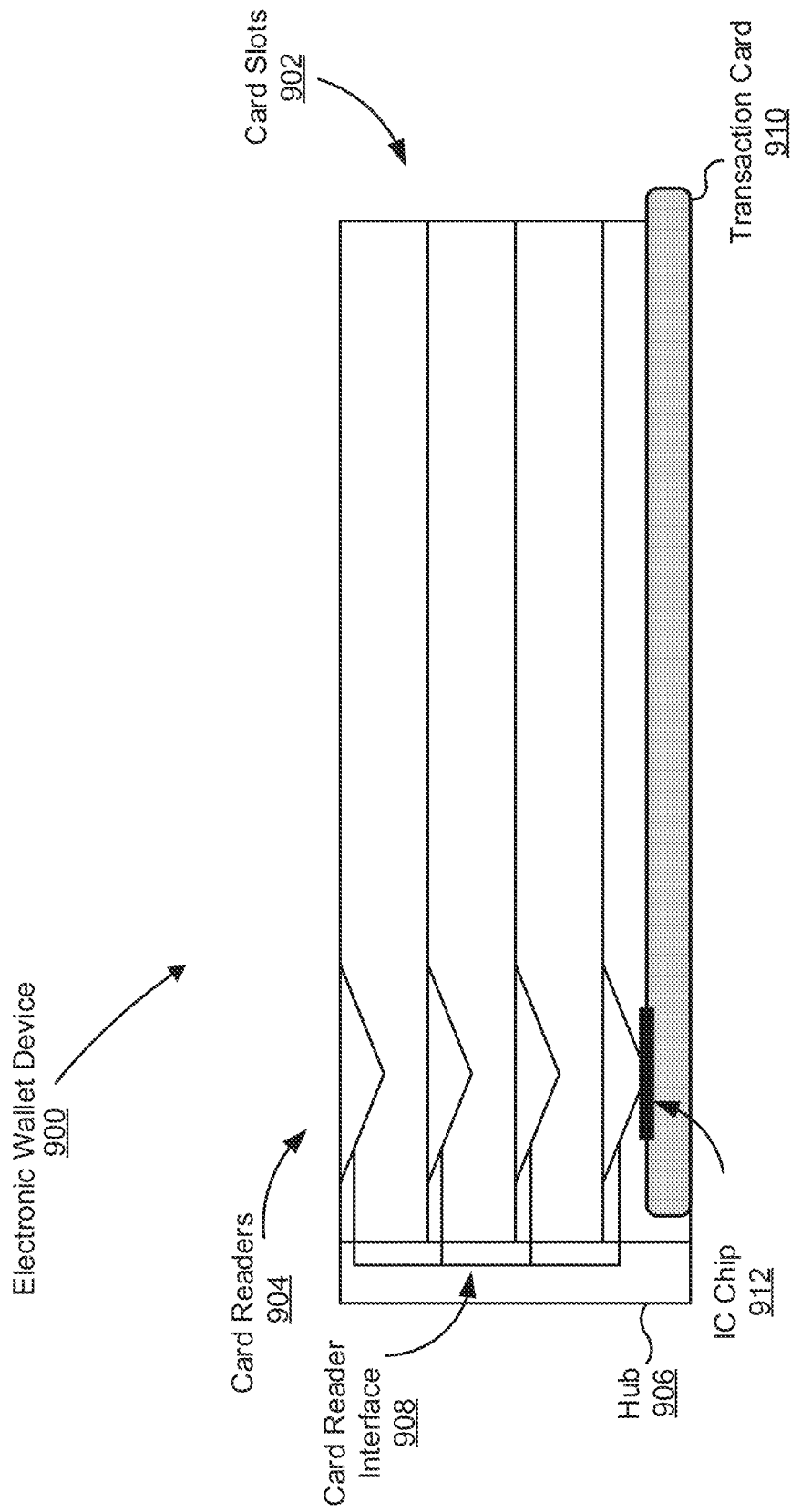
FIGS. 9-12 are diagrams of example implementations of an electronic wallet device described herein.

FIG. 9 is a diagram of an example implementation of an electronic wallet device 900 described herein. Electronic wallet device 900 may correspond to electronic wallet device 210 of FIG. 2. As shown in FIG. 9, electronic wallet device 900 may include card slots 902 with card readers 904 in each of card slots 902. Card readers 904 are configured to interface with transaction cards (e.g., IC chips of transaction cards) inserted into card slots 902. Although electronic wallet device 900 is shown to include four card slots 902, electronic wallet device 900 may include more or less than four card slots 902.

The electronic wallet device 900 of FIG. 9 includes a hub 906. As shown, the hub 906 includes a card reader interface 908 that is communicatively coupled with the card readers 904 of the card slots 902. In some implementations, hub 906 may include one or more processors (e.g., processor 320) and/or one or more communication interfaces (e.g., communication interface 370). For example, the one or more processors of hub 906 may communicate with other devices via a Bluetooth communication interface, a BLE interface, a NFC interface, a Wi-Fi communication interface, and/or the like. In some implementations, card reader interface 908 may include or be implemented by a switching component that includes one or more switches enabling or disabling access to card readers 904.

According to some implementations, card slots 902 are configured to receive transaction cards. As shown in FIG. 9, transaction card 910 is inserted into one of the card slots 902. Transaction card 910 may be inserted such that an IC chip 912 of the transaction card is communicatively coupled (e.g., in physical contact) with a corresponding card reader 904 of the corresponding card slot 902. Accordingly, hub 906 may obtain card information associated with transaction card 910 and/or a transaction token from transaction card 910 via card reader 904. Using the card reader interface 908, hub 906 may provide the transaction terminal to another device (e.g., smart transaction card 220, transaction terminal 230, user device 240, and/or the like). In some implementations, hub 906 may be used to receive, request, analyze, and/or compare card information and/or transaction information for a transaction according to some implementations described herein.

In some implementations, electronic wallet device 900 of FIG. 9 may include a user interface (e.g., input component 350, output component 360, and/or the like). For example, a user interface of electronic wallet device 900 may enable a user to configure settings for hub 906, enter information associated with transaction cards inserted into the card slots 902, enter preferences for selecting transaction cards in card slots 902 (e.g., by weighting avoiding transaction fees more than rewards earning potential or vice versa), and/or the like. In some implementations, hub 906 may be configured via a user interface of another device in communication with electronic wallet device 900 (e.g., user device 240).

In some implementations, a user interface of electronic wallet device 900 may include a mechanical mechanism to select which of the transaction cards is to be used in a particular transaction and/or available for use in a particular transaction. For example, the user interface may include a mechanical switching apparatus that connects and/or disconnects the transaction cards in the card slots 902 to/from the card reader interface 908. Accordingly, electronic wallet device 900 may hold cards in card slots 902 without making them available for use in a transaction.

In some implementations, electronic wallet device 900 may be a wearable item and/or wearable device and/or included within a wearable item and/or wearable device. For example, electronic wallet device 900 may be integrated into an article of clothing (e.g., shorts, pants, a shirt, a coat, under garments, and/or the like), a belt, a bag, a purse, a backpack, a wallet, a wrist band, a sleeve, an arm strap, and/or the like. Furthermore, in some implementations, card slots 902 with card readers 904 may be integrated into the wearable device. For example, the card slots 902 may be pockets of the wearable device, may be included within pockets of the wearable device, or may appear to be pockets of the wearable device. In such cases, the transaction cards may be received via openings in the pockets of the wearable device. Accordingly, in some implementations, a consumer may insert transaction cards into a wearable device worn on the consumer's person. As such, the transaction cards of the electronic wallet device may be worn or held by a consumer in a manner that enables the consumer to carryout transactions without removing the transaction cards from electronic wallet device 210 of the wearable device. For example, the electronic wallet device may communicate with a transaction terminal via a smart transaction card (e.g., smart transaction card 220), a user device (e.g., user device 240), and/or any other device that may be more accessible to a user than the transaction cards held in the electronic wallet device.

In some implementations, a smart transaction card (e.g., similar to smart transaction card 220) may be inserted into a card slot electronic wallet device 900. In such cases, the smart transaction card in the electronic wallet device may serve as a hub and/or communication device to facilitate selection of a transaction card in the remaining card slots of card slots 902, communication with a transaction terminal (e.g., transaction terminal 230) and/or communication with a user device (e.g., user device 240). Accordingly, a smart transaction card in a card slot 902 of electronic wallet device 900 may implement the example processes and devices described herein.

In this way, electronic wallet device 900 may be used to receive and/or hold a plurality of transaction cards and provide a transaction token from at least one of the plurality of transaction cards according to some implementations described herein.

As indicated above, FIG. 9 is provided merely as an example. Other examples are possible and may differ from what was described with regard to FIG. 9.

Figure 10:
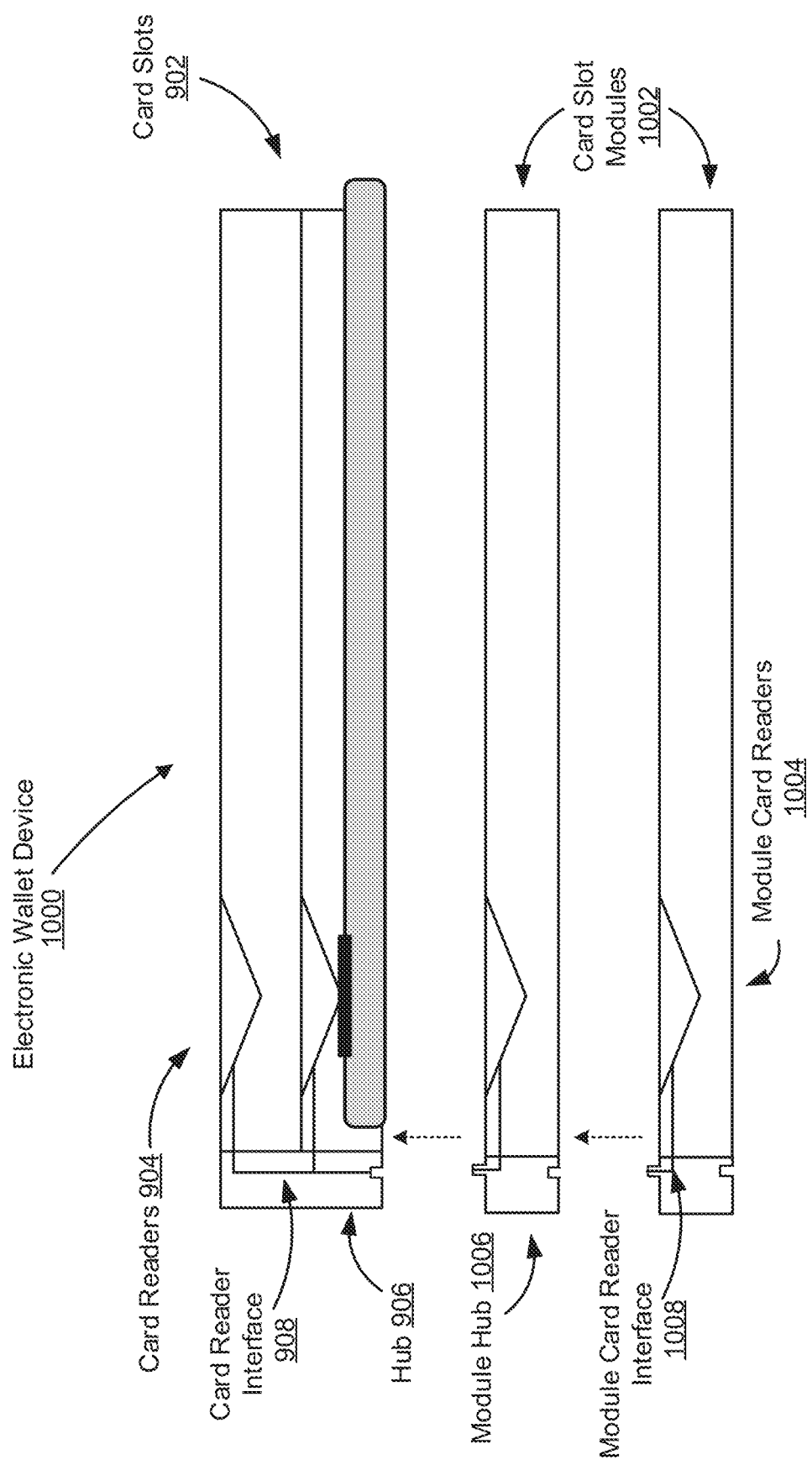

FIG. 10 is a diagram of an example implementation of an electronic wallet device 1000 described herein. Electronic wallet device 1000 may correspond to electronic wallet device 210 of FIG. 2. In FIG. 10, the reference numbers in common with FIG. 9 identify the same or similar elements. For example, electronic wallet device 1000 may include card slots 902, card readers 904, hub 906, card reader interface 908, and/or one or more features described above in connection with FIG. 9.

As shown in FIG. 10, electronic wallet device 1000 may be modular in that electronic wallet device 1000 may add or remove one or more card slot modules 1002 and/or other components. Accordingly, electronic wallet device 1000 may be adjustable and may hold variable amounts of transaction cards. As shown in FIG. 10, card slot modules 1002 may include module card readers 1004, module hubs 1006, and/or module card reader interfaces 1008. In some implementations, when card slot modules 1002 are attached (e.g., communicatively coupled) to electronic wallet device 1000, module hubs 1006 may connect with hub 906 and module card reader interfaces 1008 may connect with card reader interface 908. Accordingly, when card slot modules 1002 are connected with electronic wallet device 1000, electronic wallet device 1000 may include four card slots (e.g., similar to electronic wallet device 900 of FIG. 9).

Accordingly, electronic wallet device 1000 may be a modular device that is capable of adding and/or removing card slots. In some implementations, other features of electronic wallet devices described herein may be modular. For example, hub 906 (and/or components of hub 906) may be removable and/or replaceable. Accordingly, functionality of electronic wallet device 1000 may be adjustable.

As indicated above, FIG. 10 is provided merely as an example. Other examples are possible and may differ from what was described with regard to FIG. 10.

Figure 11:
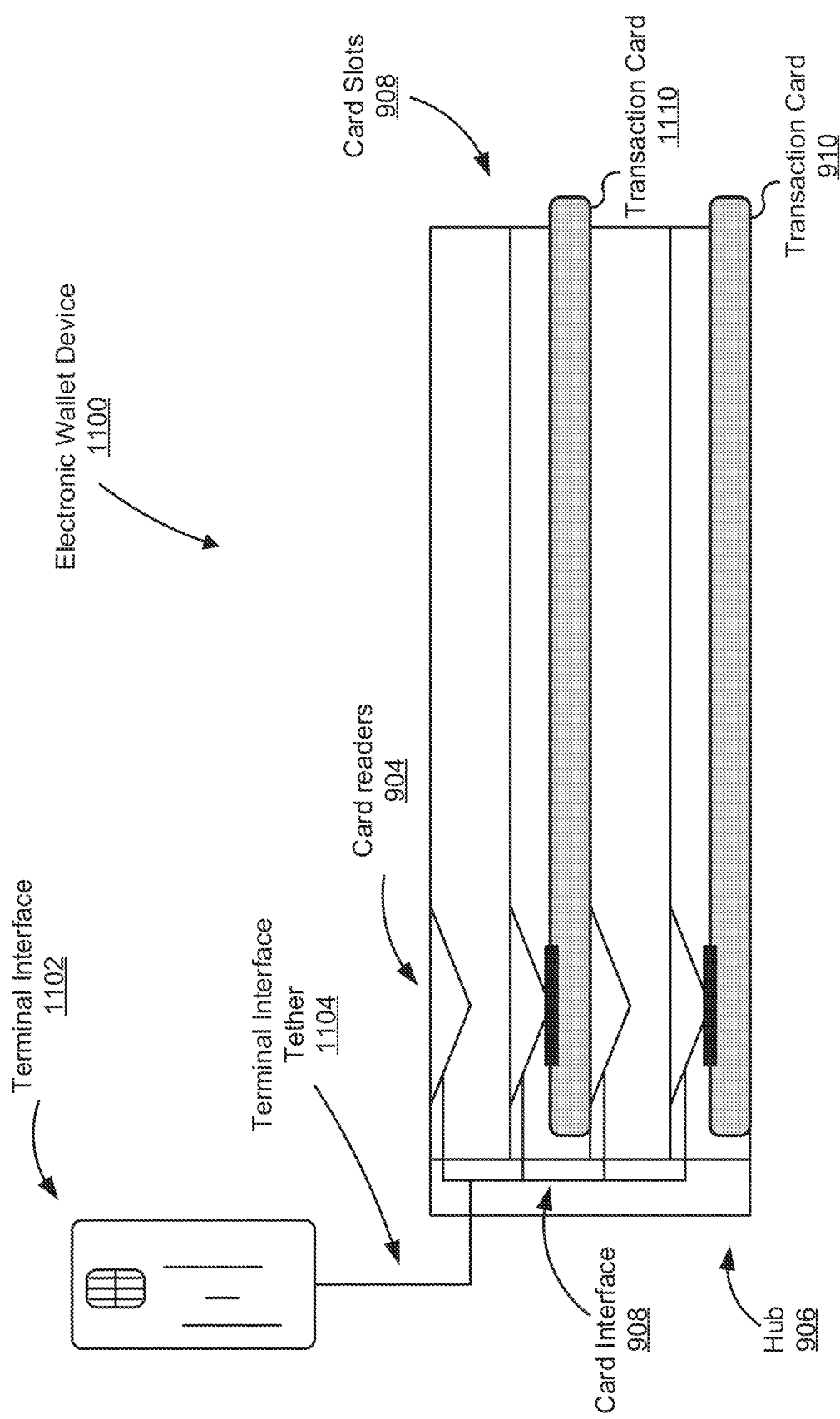

FIG. 11 is a diagram of an example implementation of an electronic wallet device 0 described herein. Electronic wallet device 1100 may correspond to electronic wallet device 210 of FIG. 2. In FIG. 11, the reference numbers in common with FIG. 9 identify the same or similar elements. For example, electronic wallet device 1100 may include card slots 902, card readers 904, hub 906, card reader interface 908, and/or one or more features described above in connection with FIG. 9.

As shown in FIG. 11, electronic wallet device 1100 may include a terminal interface 1102 that may directly communicate with a transaction terminal (e.g., transaction terminal 230). For example, terminal interface 1102 may include a plurality of interfaces to interact with a transaction terminal, such as a magnetic strip, an IC chip, an RF antenna, and/or the like. Accordingly, terminal interface 1102 may be used in a similar manner as a transaction card. As such, terminal interface 1102 may be used to obtain information (e.g., transaction information or notifications of a pending transaction) from a transaction terminal and/or provide information or data (e.g., a transaction token) to a transaction terminal.

As shown in FIG. 11, terminal interface 1102 is connected to card reader interface 908 of electronic wallet device 1100 via a terminal interface tether 1104. Terminal interface tether 1104 may include a wired communication interface (e.g., a conductive wire) to connect the terminal interface with hub 906 and/or card reader interface 908. Accordingly, hub 906 may exchange information with transaction terminals via terminal interface 1102 through the transaction interface tether 1104.

In the example of FIG. 11, hub 906 of electronic wallet device 1100 may provide a transaction token from transaction card 910 and/or transaction card 1110 to a transaction terminal via terminal interface 1102.

As indicated above, FIG. 11 is provided merely as an example. Other examples are possible and may differ from what was described with regard to FIG. 11.

Figure 12:
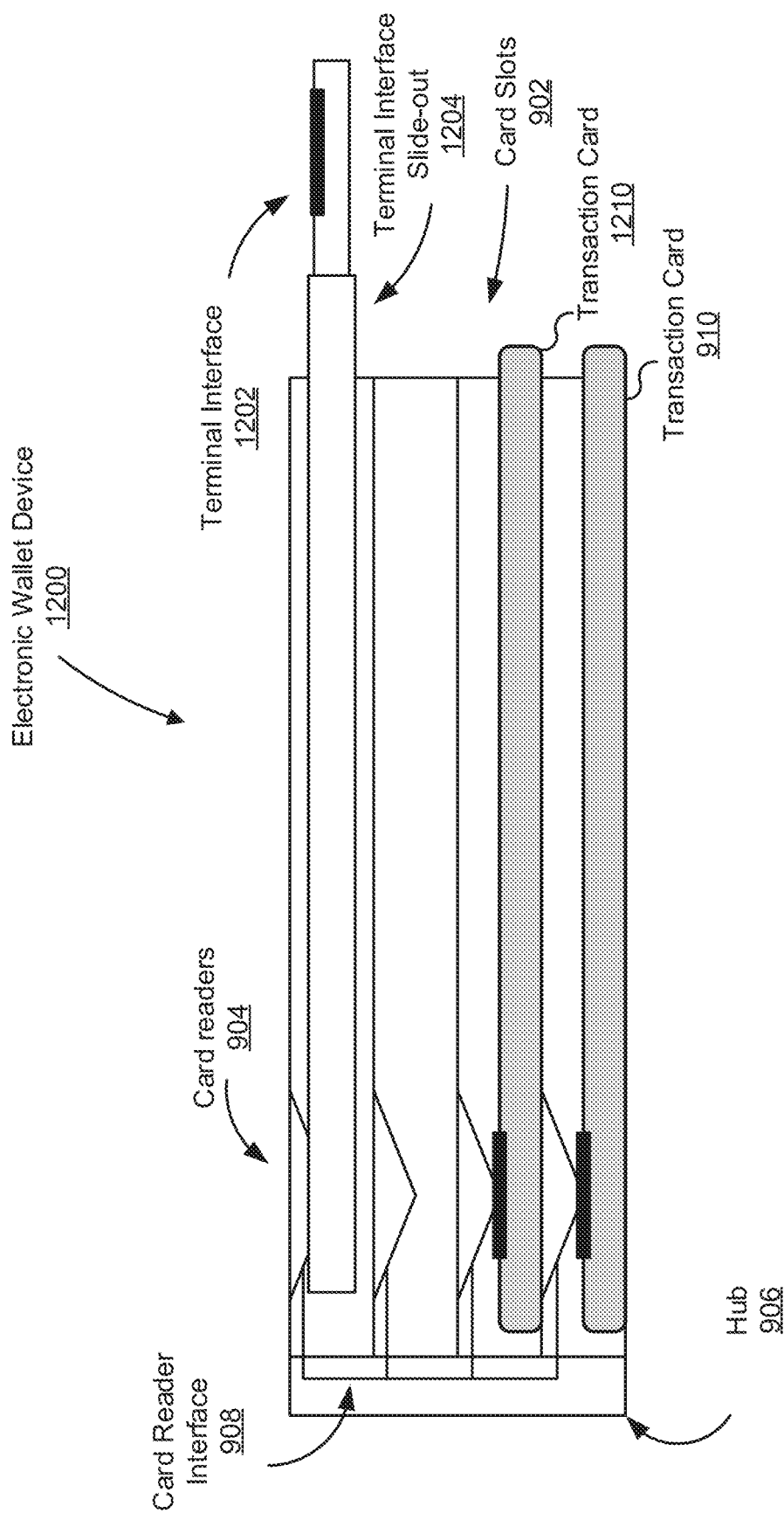

FIG. 12 is a diagram of an example implementation of an electronic wallet device 1200 described herein. Electronic wallet device 1200 may correspond to electronic wallet device 210 of FIG. 2. In FIG. 12, the reference numbers in common with FIG. 9 identify the same or similar elements. For example, electronic wallet device 1200 may include card slots 902, card readers 904, hub 906, card reader interface 908, and/or one or more features described above in connection with FIG. 9.

As shown in FIG. 12, electronic wallet device 1200 may include a terminal interface 1202 that may directly communicate with a transaction terminal (e.g., transaction terminal 230). For example, terminal interface 1202 may include a plurality of interfaces to interact with a transaction terminal, such as a magnetic strip, an IC chip, an RF antenna, and/or the like. Accordingly, terminal interface 1202 may be used in a similar manner as a terminal interface 1102 of FIG. 11.

As shown in FIG. 12, terminal interface 1202 is located on a terminal interface slide-out 1204. Terminal interface slide-out 1204 may be a mechanism that may be extendable for interaction with a transaction terminal and/or retractable into electronic wallet device 1200. In FIG. 12, the terminal interface slide-out may be communicatively coupled with card reader interface 908 such that hub 906 may obtain transaction information from transaction terminals and/or provide information or data (e.g., transaction tokens) from transaction cards inserted into electronic wallet device 1200.

In the example of FIG. 12, hub 906 of electronic wallet device 1200 may provide a transaction token from transaction card 910 and/or transaction card 1210 to a transaction terminal via terminal interface 1202.

As indicated above, FIG. 12 is provided merely as an example. Other examples are possible and may differ from what was described with regard to FIG. 12.

Accordingly, examples herein provide an electronic wallet device 210 that is capable of performing a transaction at a transaction terminal 230 using one or more transaction cards that are inserted into electronic wallet device 210. In some implementations, electronic wallet device 210 may communicate with smart transaction card 220 and/or user device 240 to facilitate a transaction at transaction terminal 230. In some implementations, a transaction card may be selected from the plurality of transaction cards in electronic wallet device 210 for a particular transaction. For example, the transaction card may be selected based on transaction information and/or based on card information (e.g. based on account information and/or based on rewards information) associated with the transaction card. As such, a consumer may utilize electronic wallet device 210 as described herein for an enhanced user experience when entering into transactions (e.g., the consumer does not have to sift through a plurality of cards, find the correct card for a transaction, or choose what is believed to be an optimal card for the transaction). Furthermore, according to some implementations described herein, a consumer may increase benefits (e.g., by maximizing rewards earning potential) when entering into transactions and/or avoid transaction fees by using electronic wallet device 210 to select a best transaction card for a transaction relative to the other cards in electronic wallet device 210. Moreover, transaction failures may be avoided using electronic wallet device 210 as electronic wallet device 210 may not select or use transaction cards for a transaction that may be declined (e.g., by determining that a particular transaction may cause credit limits of the accounts of the transaction cards to be reached or exceeded), thus saving consumer resources and/or transaction terminal resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An electronic wallet device, comprising:
   a hub,
   a user interface to configure settings for the hub,
   a plurality of card slots configured to hold transaction cards,
     each card slot, of the plurality of card slots, including a card reader, of a plurality of card readers, and
     the plurality of card slots for holding at least two transaction cards;
   a card reader interface communicatively coupled to the plurality of card readers,
     the card reader interface including a switching component to selectively connect the at least two transaction cards received in the plurality of card slots to corresponding card readers,
       the switching component including one or more switches for enabling or disabling access to the corresponding card readers;
   a communication interface for communication between the electronic wallet device and one or more components; and
   one or more processors to:
     receive, via the communication interface, transaction information associated with a transaction;
     obtain card information, associated with the at least two transaction cards, including:
       rewards information associated with each of the at least two transaction cards,
         the rewards information including at least one of:
           a rewards category, or
           rewards earning information,
       the at least two transaction cards being held in the electronic wallet device;
     select a transaction card, of the at least two transaction cards, based on the transaction information and the card information,
       the transaction card being selected based upon a scoring system,
         a first transaction card of the at least two transaction cards being selected, as the transaction card, when a first card parameter is weighted more than a second card parameter, or
         a second transaction card of the at least two transaction cards being selected, as the transaction card, when the second card parameter is weighted more than first card parameter; and
     provide, via the communication interface, a transaction token, associated with the selected transaction card, to be used in connection with processing the transaction.

2. The electronic wallet device of claim 1, where the transaction information includes a merchant identifier,
   the merchant identifier including information indicating a merchant category associated with the transaction.

3. The electronic wallet device of claim 2, where the one or more processors are to:
   analyze the card information using the merchant identifier.

4. The electronic wallet device of claim 1, where the one or more processors, when selecting the transaction card, of the at least two transaction cards, based on the transaction information and the card information, are to:
   select the transaction card based on comparing the rewards information associated with each of the at least two transaction cards.

5. The electronic wallet device of claim 1, where the transaction information comprises at least one of:
information identifying acceptable forms of payment for the transaction;
information identifying acceptable types of transaction cards that may be used in the transaction;
information identifying acceptable card associations that may be used in the transaction;
information identifying a monetary value associated with the transaction;
information identifying a currency used in the transaction; or
information identifying a location information corresponding to a location of the transaction.

6. The electronic wallet device of claim 1, where the one or more processors, when providing the transaction token, are to:
provide the transaction token via at least one of:
a smart transaction card;
a terminal interface of the electronic wallet device; or
a user device.

7. The electronic wallet device of claim 1, where,
the scoring system is used to determine which of the at least two transaction cards satisfies a threshold relative to at least two other transaction cards.

8. A non-transitory computer-readable medium storing instructions, the instructions comprising:
one or more instructions that, when executed by one or more processors of an electronic wallet device, cause the one or more processors to:
selectively connect, using a switching component, at least two transaction cards received in a plurality of card slots to corresponding card readers,
the switching component including one or more switches for enabling or disabling access to the corresponding card readers;
receive, via a communication interface, transaction information associated with a transaction at a transaction terminal,
the transaction information including a merchant identifier;
obtain card information, associated with the at least two transaction cards,
the at least two transaction cards being positioned within the electronic wallet device,
the card information including at least one of:
rewards information associated with each of the at least two transaction cards,
the rewards information including at least one of:
a rewards category, or
rewards earning information, or
account information;
select a transaction card, of the at least two transaction cards, based on the transaction information and the card information,
a first transaction card of the at least two transaction cards being selected, as the transaction card, when the rewards information is weighted more than avoiding transaction fees, or
a second transaction card of the at least two transaction cards being selected, as the transaction card, when avoiding fees is weighted more than rewards information; and
provide, via the communication interface, a transaction token, associated with the selected transaction card, to be used in connection with processing the transaction.

9. The non-transitory computer-readable medium of claim 8, where the one or more instructions, that cause the one or more processors to obtain the card information, cause the one or more processors to:
obtain the card information via a user device in communication with the electronic wallet device.

10. The non-transitory computer-readable medium of claim 8, where the one or more instructions, that cause the one or more processors to receive the transaction information, cause the one or more processors to:
receive the transaction information from a user device in communication with the electronic wallet device.

11. The non-transitory computer-readable medium of claim 8, where the one or more instructions, that cause the one or more processors to provide the transaction token, cause the one or more processors to:
provide the transaction token to the transaction terminal via a user device.

12. The non-transitory computer-readable medium of claim 8, where the one or more instructions, when executed by the one or more processors, further cause the one or more processors to:
identify that the electronic wallet device holds the at least two transaction cards based on detecting that an integrated circuit (IC) chip of each of the at least two transaction cards is communicatively coupled with a card reader of the electronic wallet device.

13. The non-transitory computer-readable medium of claim 8, where the transaction information comprises at least one of:
information identifying acceptable forms of payment for the transaction;
information identifying acceptable types of transaction cards that may be used in the transaction;
information identifying acceptable card associations that may be used in the transaction;
information identifying a monetary value associated with the transaction;
information identifying a currency used in the transaction; or
information identifying a location information corresponding to a location of the transaction.

14. The non-transitory computer-readable medium of claim 8, where the one or more instructions, when executed by the one or more processors, further cause the one or more processors to:
analyze the card information using the merchant identifier.

15. A method, comprising:
selectively connecting, by a device and using a switching component, at least two transaction cards received in a plurality of card slots to corresponding card readers,
the switching component including one or more switches for enabling or disabling access to the corresponding card readers;
receiving, by the device and via a communication interface, transaction information associated with a transaction at a transaction terminal,
the transaction information including information indicating a merchant category associated with the transaction;
obtaining, by the device, card information, associated with the at least two transaction cards, the card information including at least one of:
- rewards information associated with each of the at least two transaction cards,
  - the rewards information including at least one of:
    - a rewards category, or
    - rewards earning information, or
- account information;

selecting, by the device, a transaction card, of the at least two transaction cards, based on the transaction information and the card information,
- a first transaction card of the at least two transaction cards being selected, as the transaction card, when a first card parameter is weighted more than a second card parameter, or
- a second transaction card of the at least two transaction cards being selected, as the transaction card, when the second card parameter is weighted more than first card parameter; and providing, by the device and via the communication interface, a transaction token, associated with the selected transaction card, to be used in connection with processing the transaction.

16. The method of claim 15, where selecting the transaction card, of the at least two transaction cards, based on the transaction information and the card information comprises:
selecting the transaction card based on a scoring system,
the scoring system for determining which of the at least two transaction cards satisfies a threshold relative to at least two other transaction cards.

17. The method of claim 15, further comprising:
providing a user interface to enable a user to enter preferences for selecting the transaction card.

18. The method of claim 15, where selecting the transaction card, of the at least two transaction cards, based on the transaction information and the card information, comprises:
selecting the transaction card based on a monetary value or fee associated with the transaction.

19. The method of claim 15, where the transaction information comprises at least one of:
information identifying acceptable forms of payment for the transaction;
information identifying acceptable types of transaction cards that may be used in the transaction;
information identifying acceptable card associations that may be used in the transaction;
information identifying a monetary value associated with the transaction;
information identifying a currency used in the transaction; or
information identifying a location information corresponding to a location of the transaction.

20. The method of claim 15, where selecting the transaction card, of the at least two transaction cards, based on the transaction information and the card information, comprises:
selecting the transaction card based on comparing the rewards information associated with each of the at least two transaction cards.

* * * * *